(12) United States Patent
Bakhuis et al.

(10) Patent No.: US 9,506,452 B2
(45) Date of Patent: Nov. 29, 2016

(54) METHOD FOR INSTALLING A SHEAR WEB INSERT WITHIN A SEGMENTED ROTOR BLADE ASSEMBLY

(71) Applicant: General Electric Company, Schenectady, NY (US)

(72) Inventors: Willem Jan Bakhuis, Nijverdal (NL); Darren John Danielsen, Glenville, NY (US)

(73) Assignee: General Electric Company, Schenectady, NY (US)

( * ) Notice: Subject to any disclaimer, the term of this patent is extended or adjusted under 35 U.S.C. 154(b) by 505 days.

(21) Appl. No.: 14/012,192

(22) Filed: Aug. 28, 2013

(65) Prior Publication Data

US 2015/0064014 A1    Mar. 5, 2015

(51) Int. Cl.
   *F03D 1/06*    (2006.01)
   *F03D 1/00*    (2006.01)

(52) U.S. Cl.
   CPC ............ *F03D 1/065* (2013.01); *F03D 1/001* (2013.01); *F03D 1/003* (2013.01); *F03D 1/0675* (2013.01); *F05B 2240/302* (2013.01); *Y02E 10/721* (2013.01); *Y10T 29/49318* (2015.01)

(58) Field of Classification Search
   CPC .... F03D 1/065; F03D 1/0675; F03D 1/0683; F03D 1/00; F03D 1/03; F03D 1/01; Y10T 29/49318; F05B 2240/302
   USPC ......................................... 416/226; 29/889.71
   See application file for complete search history.

(56) References Cited

U.S. PATENT DOCUMENTS

| 2,312,219 A | 4/1943 | Sensenich |
| 4,295,790 A * | 10/1981 | Eggert, Jr. ............ F03D 1/0675 416/226 |
| 4,474,536 A | 10/1984 | Gougeon et al. |
| 4,671,470 A * | 6/1987 | Jonas ................ B29C 66/43461 244/119 |
| 4,732,542 A | 3/1988 | Hahn et al. |

(Continued)

FOREIGN PATENT DOCUMENTS

| DE | 19962989 | 7/2001 |
| DE | 10336461 | 3/2005 |

(Continued)

OTHER PUBLICATIONS

European Search Report issued in connection with corresponding EP Application No. 14180650.5 on Dec. 2, 2014.
U.S. Appl. No. 13/663,779, filed Oct. 30, 2012.
U.S. Appl. No. 13/663,785, filed Oct. 30, 2012.
U.S. Appl. No. 12/915,686, filed Oct. 29, 2010.
U.S. Appl. No. 13/856,635, filed Apr. 4, 2013.

(Continued)

*Primary Examiner* — Jesse Bogue
*Assistant Examiner* — Jessica Kebea
(74) *Attorney, Agent, or Firm* — Dority & Manning, P.A.

(57) ABSTRACT

A method for installing a shear web insert between a blade segment and a blade insert of a rotor blade assembly is disclosed. The blade segment may include a first shear web and the blade insert may include a second shear web. The method may generally include coupling a first positioning device along an inner surface of a first side of the rotor blade assembly, inserting the shear web insert horizontally between the first and second shear webs until a first side face of the shear web insert engages the first positioning device and coupling a first retention device along the inner surface of the first side of the rotor blade assembly so that the first retention device is positioned adjacent to a second side face of the shear web insert, wherein the second side face is opposite the first side face.

20 Claims, 22 Drawing Sheets

(56) References Cited

U.S. PATENT DOCUMENTS

| | | | |
|---|---|---|---|
| 5,088,665 | A | 2/1992 | Vijgen et al. |
| 6,729,846 | B1 | 5/2004 | Wobben |
| 6,972,498 | B2 | 12/2005 | Jamieson et al. |
| 7,334,989 | B2 | 2/2008 | Arelt |
| 7,381,029 | B2 | 6/2008 | Moroz |
| 7,393,184 | B2 | 7/2008 | Cairo |
| 7,393,488 | B2* | 7/2008 | Grose .................. B29C 65/527 264/254 |
| 7,427,189 | B2 | 9/2008 | Eyb |
| 7,470,114 | B2 | 12/2008 | Bonnet |
| 7,517,198 | B2 | 4/2009 | Baker et al. |
| 7,521,105 | B2 | 4/2009 | Bech et al. |
| 7,581,926 | B1 | 9/2009 | Dehlsen et al. |
| 7,582,977 | B1 | 9/2009 | Dehlsen et al. |
| 7,637,721 | B2 | 12/2009 | Driver et al. |
| 7,740,453 | B2 | 6/2010 | Zirin et al. |
| 7,798,780 | B2 | 9/2010 | Bakhuis et al. |
| 7,810,757 | B2* | 10/2010 | Kirkwood ................ B64C 3/28 244/123.1 |
| 7,841,835 | B2* | 11/2010 | Bagepalli ............. F03D 1/0675 416/226 |
| 7,922,454 | B1* | 4/2011 | Riddell ................. F03D 1/001 416/224 |
| 7,927,077 | B2 | 4/2011 | Olson |
| 7,976,275 | B2 | 7/2011 | Miebach et al. |
| 8,167,569 | B2* | 5/2012 | Livingston ............. F03D 1/001 416/1 |
| 8,171,633 | B2* | 5/2012 | Zirin .................... F03D 1/0675 29/889.6 |
| 8,235,671 | B2 | 8/2012 | Yarbrough |
| 8,257,048 | B2* | 9/2012 | Yarbrough ............ F03D 1/065 244/123.8 |
| 8,393,871 | B2* | 3/2013 | Yarbrough ............ F03D 1/065 416/226 |
| 8,449,259 | B1* | 5/2013 | Kaser ................. F03D 11/0033 416/146 R |
| 8,632,312 | B2* | 1/2014 | Jensen ................ F03D 1/0675 29/889.721 |
| 8,973,871 | B2* | 3/2015 | Marcoe .................. B64C 3/185 156/293 |
| 2003/0044274 | A1 | 3/2003 | Deane et al. |
| 2003/0223868 | A1 | 12/2003 | Dawson et al. |
| 2005/0180853 | A1 | 8/2005 | Grabau et al. |
| 2006/0045743 | A1 | 3/2006 | Bertolotti et al. |
| 2006/0104812 | A1 | 5/2006 | Kovalsky et al. |
| 2006/0175731 | A1 | 8/2006 | Bech et al. |
| 2007/0025856 | A1 | 2/2007 | Moroz |
| 2007/0065290 | A1 | 3/2007 | Herr |
| 2007/0077150 | A1 | 4/2007 | Llorente Gonzalez |
| 2007/0243387 | A1 | 10/2007 | Lin et al. |
| 2007/0253824 | A1 | 11/2007 | Eyb |
| 2007/0286728 | A1 | 12/2007 | Hotto |
| 2007/0290118 | A1 | 12/2007 | Stiesdal |
| 2008/0061192 | A1 | 3/2008 | Sullivan |
| 2008/0069699 | A1 | 3/2008 | Bech |
| 2008/0107540 | A1 | 5/2008 | Bonnet |
| 2008/0145231 | A1 | 6/2008 | Llorente Gonzales et al. |
| 2008/0166241 | A1 | 7/2008 | Herr et al. |
| 2008/0181781 | A1 | 7/2008 | Livingston |
| 2008/0206062 | A1 | 8/2008 | Sanz Pascual et al. |
| 2008/0232966 | A1 | 9/2008 | Wang et al. |
| 2008/0240925 | A1 | 10/2008 | Kita et al. |
| 2009/0016891 | A1 | 1/2009 | Parsania et al. |
| 2009/0074585 | A1 | 3/2009 | Koegler et al. |
| 2009/0116962 | A1 | 5/2009 | Pedersen et al. |
| 2009/0136355 | A1 | 5/2009 | Finnigan et al. |
| 2009/0155084 | A1 | 6/2009 | Livingston et al. |
| 2009/0162206 | A1 | 6/2009 | Zirin et al. |
| 2009/0169323 | A1 | 7/2009 | Livingston |
| 2009/0169390 | A1 | 7/2009 | Nies |
| 2009/0236857 | A1 | 9/2009 | Stommel |
| 2009/0283639 | A1 | 11/2009 | Ackermann et al. |
| 2009/0304507 | A1 | 12/2009 | Dehlsen |
| 2009/0311106 | A1 | 12/2009 | Rohden |
| 2009/0324420 | A1 | 12/2009 | Arocena de la Rua et al. |
| 2010/0054950 | A1 | 3/2010 | Rao Kavala |
| 2010/0132884 | A1 | 6/2010 | Baehmann et al. |
| 2010/0143143 | A1 | 6/2010 | Judge |
| 2010/0143148 | A1 | 6/2010 | Chen et al. |
| 2011/0052403 | A1* | 3/2011 | Kawasetsu ............ F03D 1/0675 416/226 |
| 2011/0142663 | A1* | 6/2011 | Gill ....................... F03D 1/0675 416/226 |
| 2012/0141286 | A1 | 6/2012 | Kyriakides et al. |
| 2013/0219718 | A1* | 8/2013 | Busbey .................. F03D 1/065 29/889.71 |
| 2013/0224032 | A1* | 8/2013 | Busbey ................. F03D 1/0633 416/223 R |
| 2015/0152839 | A1* | 6/2015 | Busbey .................. F03D 1/001 416/132 B |

FOREIGN PATENT DOCUMENTS

| | | | | |
|---|---|---|---|---|
| EP | 1244873 | | 2/2002 | |
| EP | 1507084 | | 2/2005 | |
| EP | 1761702 | | 3/2007 | |
| EP | 1953383 | | 8/2008 | |
| EP | 2028366 | | 2/2009 | |
| EP | 2053240 | | 4/2009 | |
| JP | 2002357176 | | 12/2002 | |
| JP | 2003254225 | | 9/2003 | |
| JP | EP 1806285 | A1 * | 7/2007 | ............ B64C 3/00 |
| WO | WO 01/46582 | | 6/2001 | |
| WO | WO 03/078832 | | 9/2003 | |
| WO | 03102414 | | 12/2003 | |
| WO | 2004015265 | | 2/2004 | |
| WO | 2004076852 | | 9/2004 | |
| WO | 2004078465 | | 9/2004 | |
| WO | 2005031158 | | 4/2005 | |
| WO | WO 2005/064156 | | 7/2005 | |
| WO | WO 2005/100781 | | 10/2005 | |
| WO | WO 2006/002621 | | 1/2006 | |
| WO | WO 2006/056584 | | 6/2006 | |
| WO | 2006069581 | | 7/2006 | |
| WO | 2006070171 | | 7/2006 | |
| WO | 2006103307 | | 10/2006 | |
| WO | 2006133715 | | 12/2006 | |
| WO | WO2008035149 | | 3/2008 | |
| WO | WO2008/113349 | | 9/2008 | |
| WO | WO2009/025549 | | 2/2009 | |
| WO | 2009135902 | | 11/2009 | |
| WO | 2009156064 | | 12/2009 | |
| WO | WO2010/086297 | A2 | 8/2010 | |
| WO | WO2012/004571 | A2 | 1/2012 | |

OTHER PUBLICATIONS

Related U.S. Appl. No. 12/431,281, filed Apr. 28, 2009.
Related U.S. Appl. No. 12/817,549, filed Jun. 17, 2010.
Related U.S. Appl. No. 12/859,585, filed Aug. 19, 2010.
Related U.S. Appl. No. 12/861,145, filed Aug. 23, 2010.
Related U.S. Appl. No. 13/115,604, filed May 25, 2011.
Related U.S. Appl. No. 13/220,044, filed Aug. 29, 2011.
Related U.S. Appl. No. 13/272,327, filed Oct. 13, 2011.
Mark Hancock (Vestas Technology UK), *Large Multi-Part Offshore Blades Project*, 28 pages, Jun. 8, 2006, DTI & BWEA Offshore Wind R&D Workshop.
F. Sayer et al., *Testing of Adhesive joints in the Wind Industry*, 10 pages, 2009, Germany.
*Spabond 340—Epoxy Adhesive System*, 7 pages, Feb. 8, 2008.
*Spabond 340LV—Epoxy Adhesive System*, 6 pages, Sep. 13, 2009.
*HyperSizer Composite Wind Blade Software*, 16 pages, Apr. 2010.
Angel Gonzalez Palacios, *WP1B1: Innovative Rotor Blade*, 17 pages, Oct. 9, 2008, Brussels.
Dr. Maite Basutro, *Innovative Rotor Blades—Innoblade*, 2 pages, www.wind-energy-the-facts.org/enpart-i-technology/chapter-3-wind-turbine-technology/current-developments.
W.E. Handbook Structural Design pp. 1-16.

\* cited by examiner

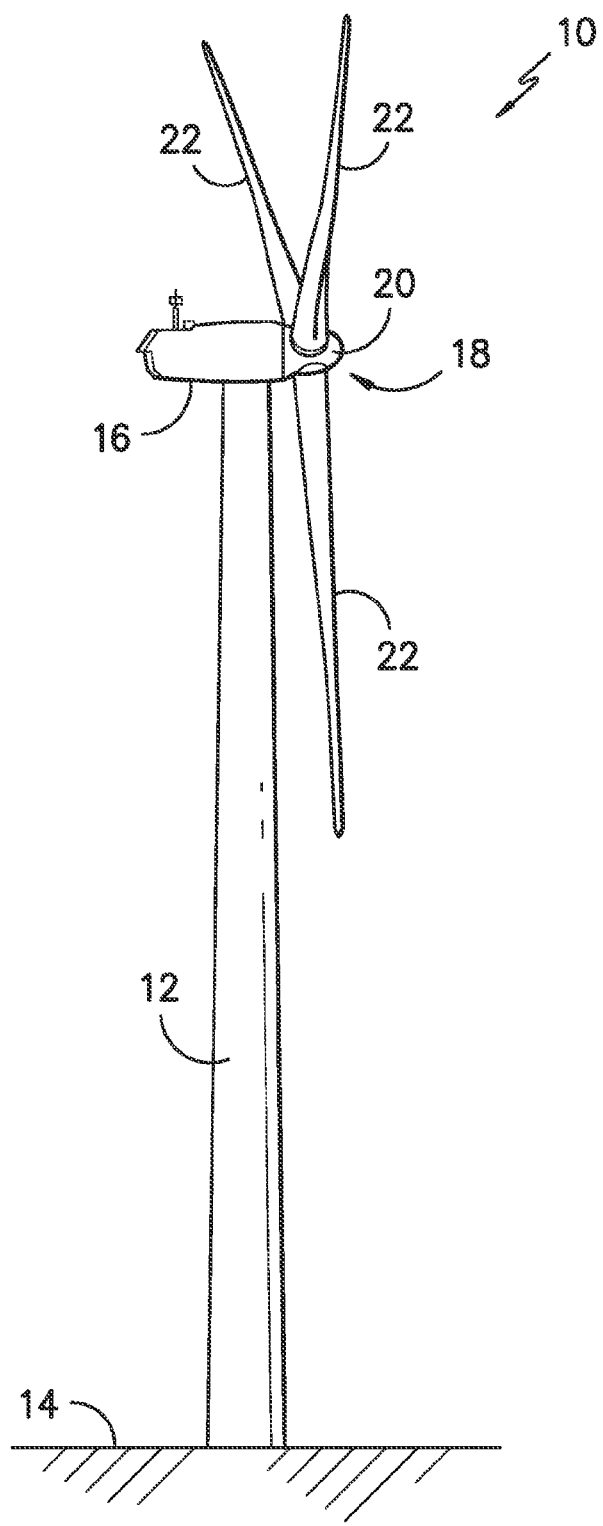
FIG. -1-

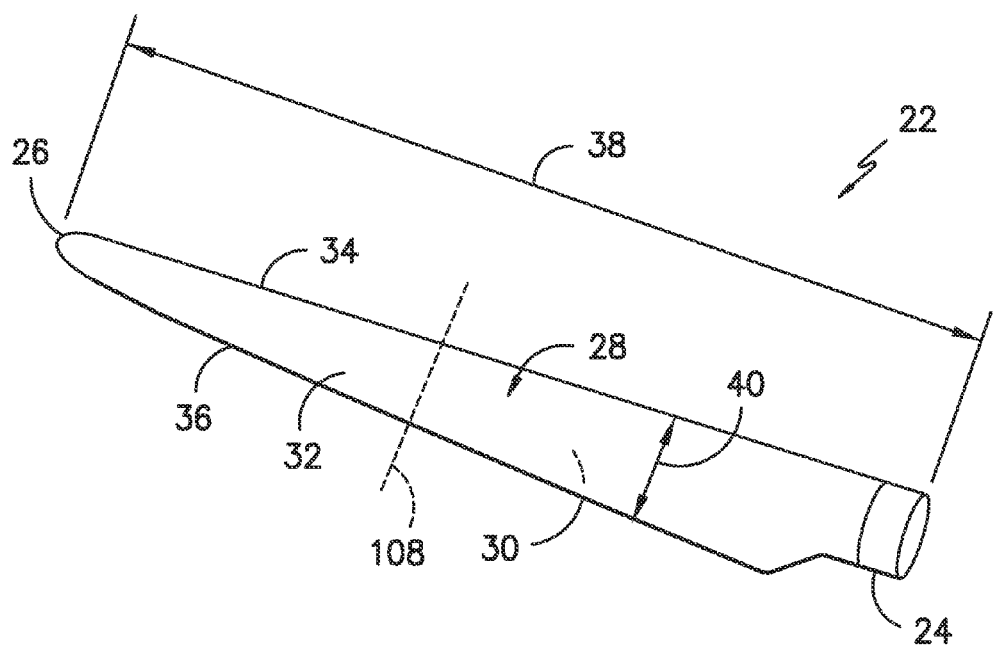
FIG. -2-

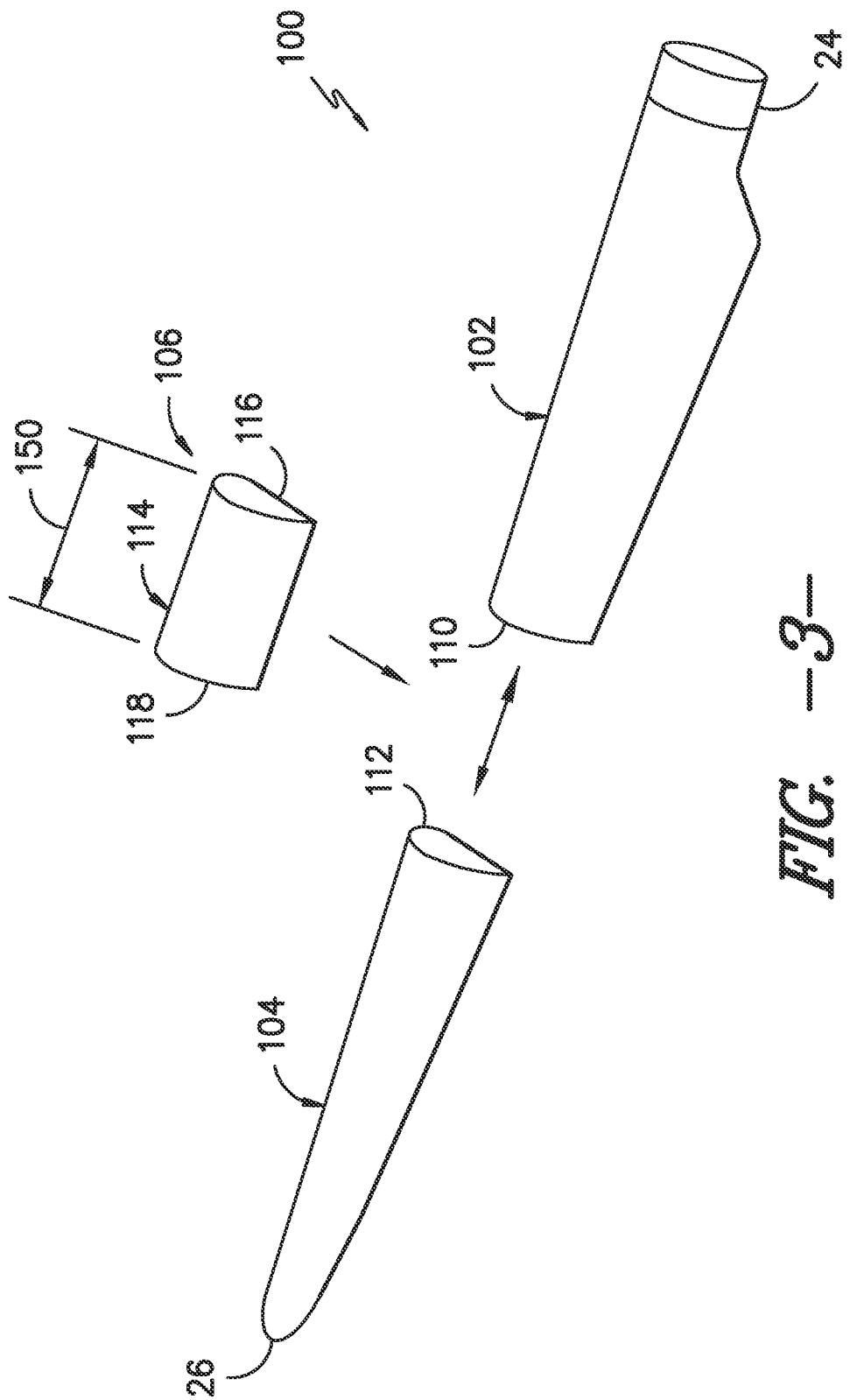

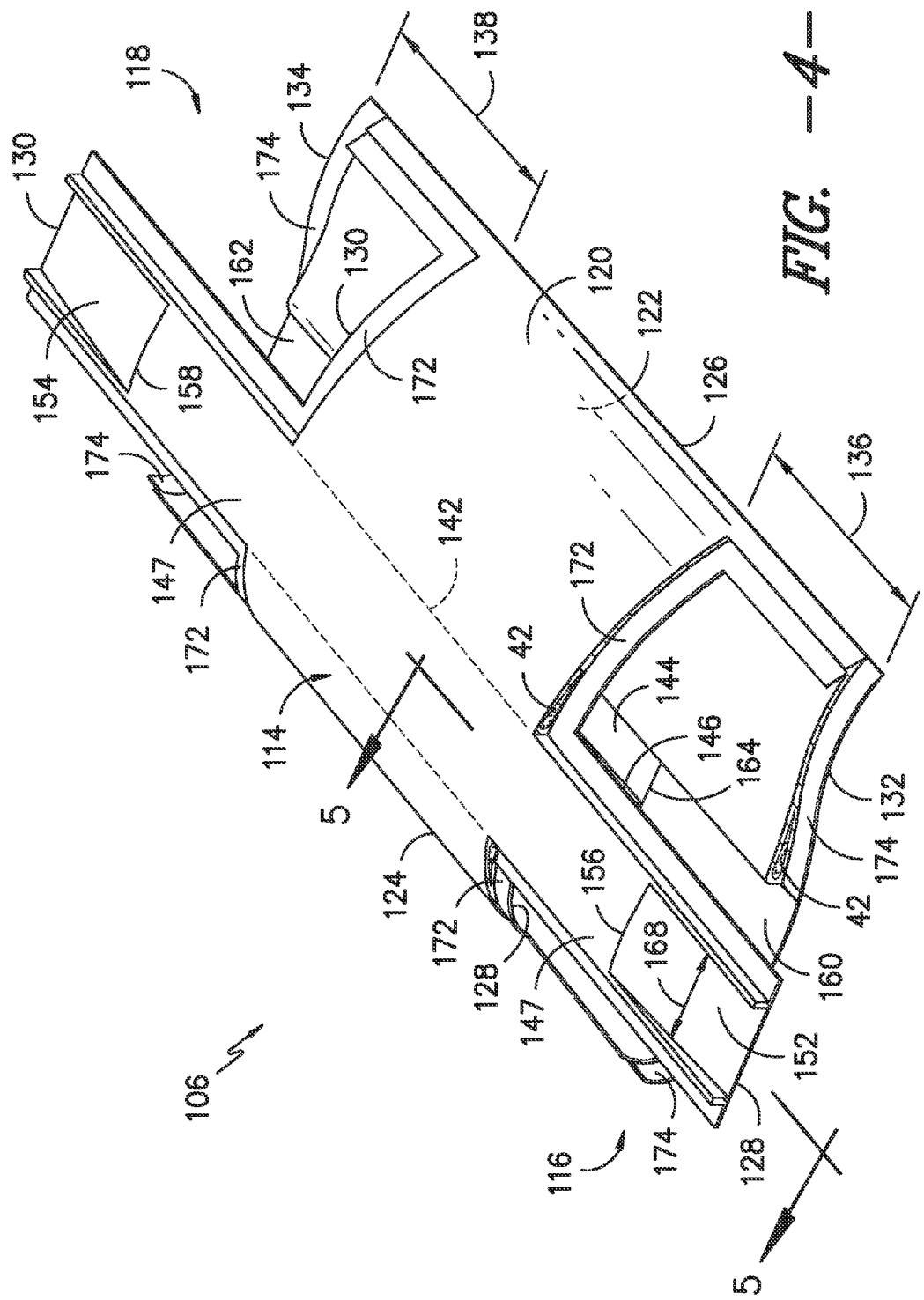

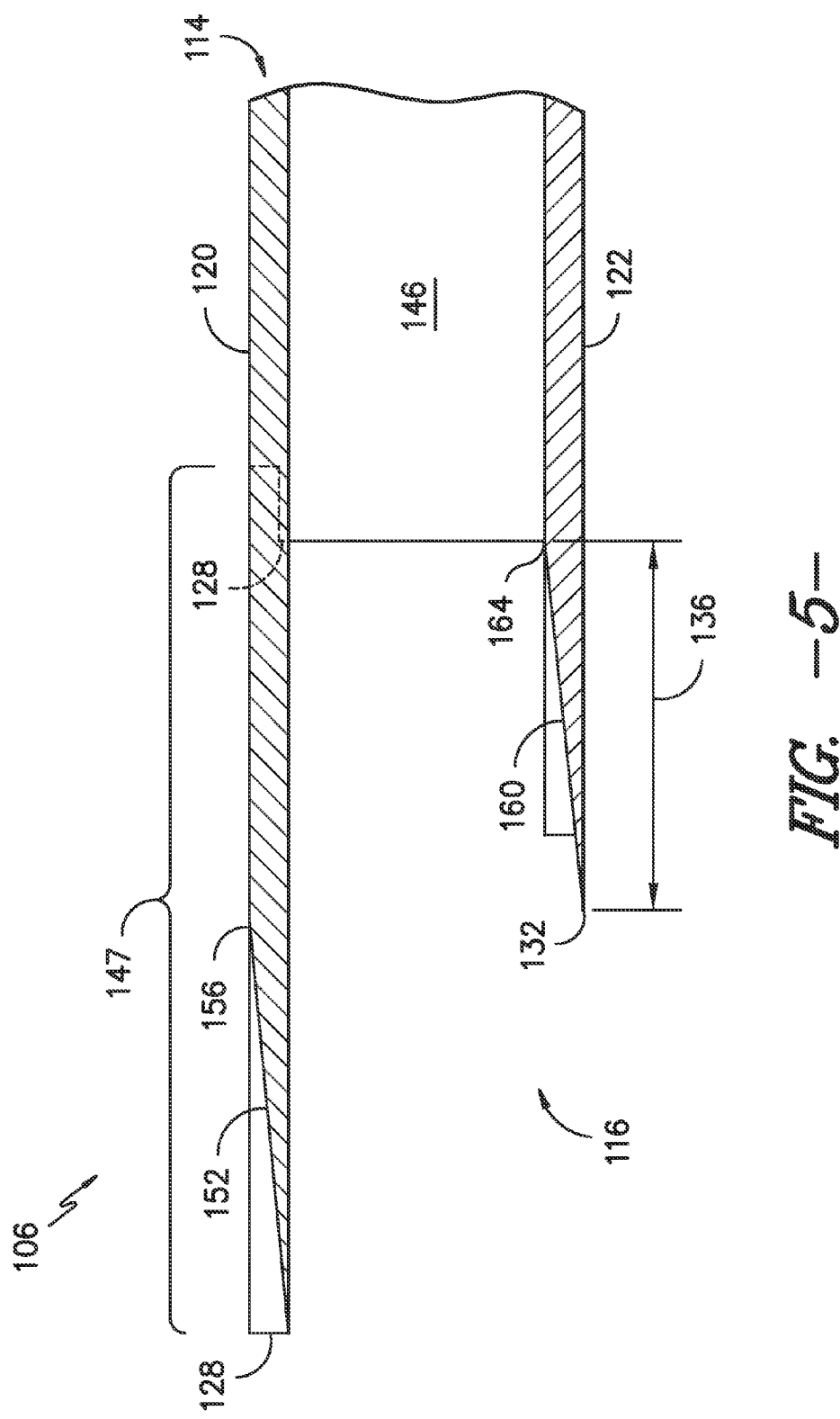
FIG. -5-

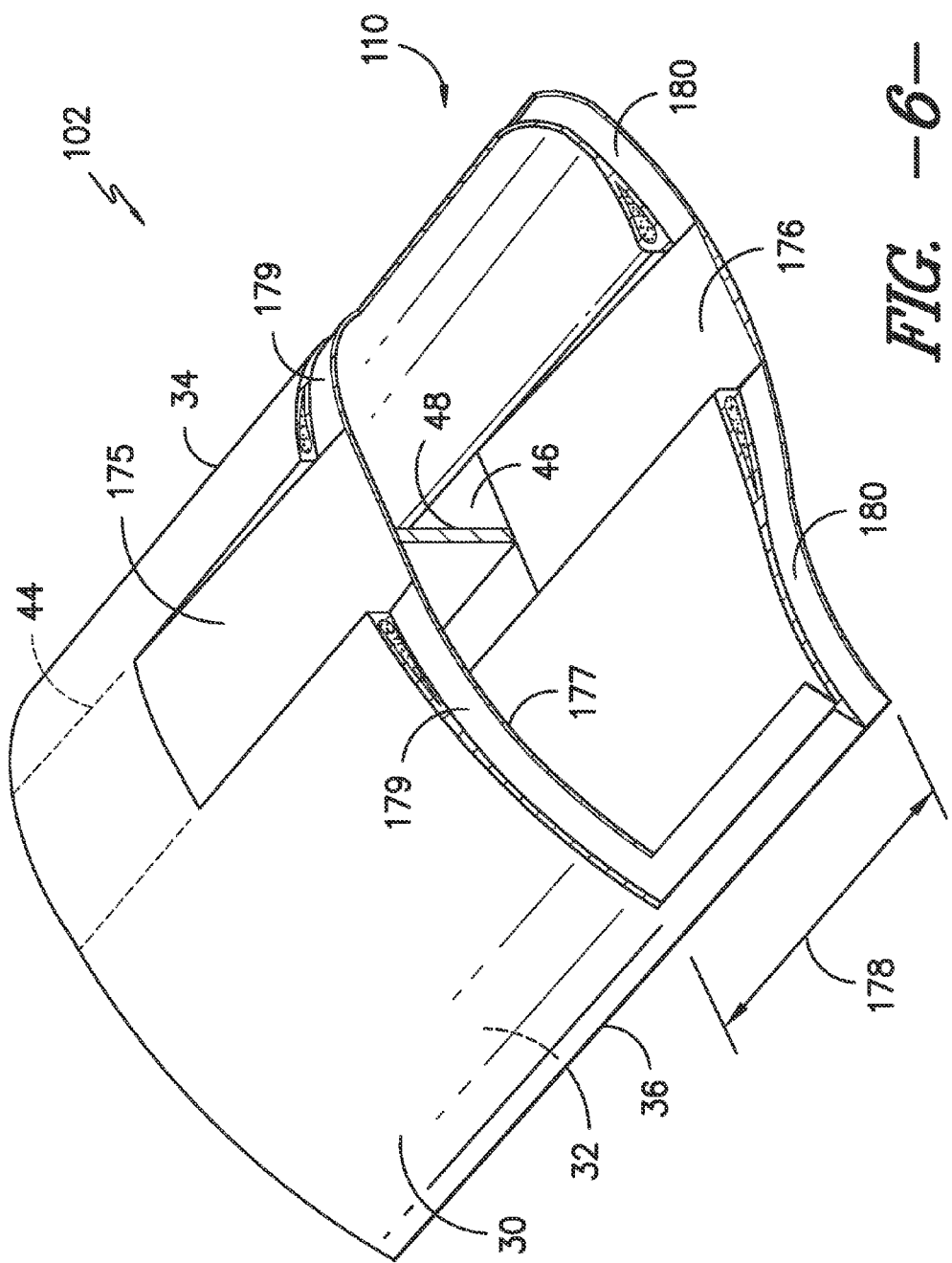

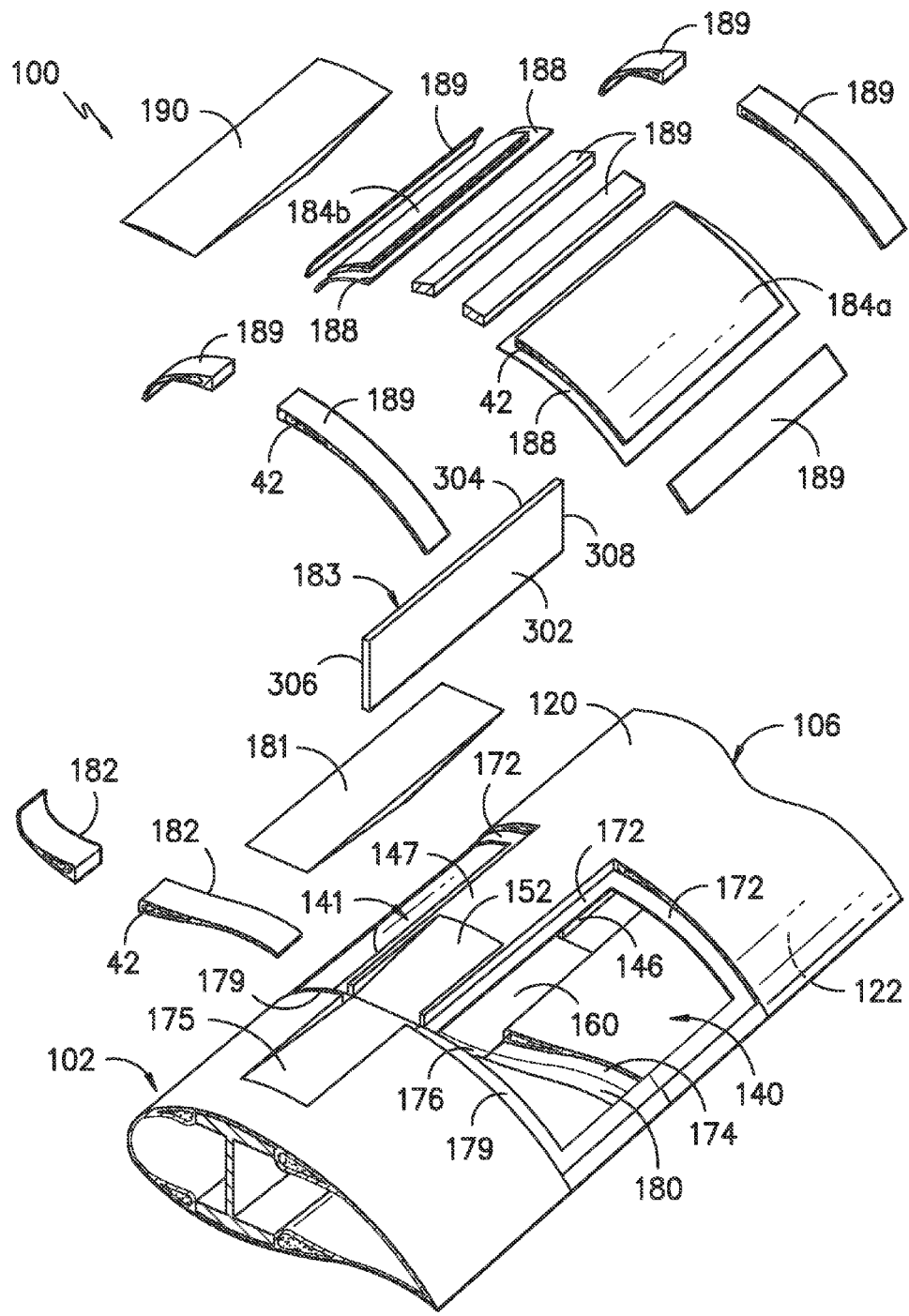
FIG. -7-

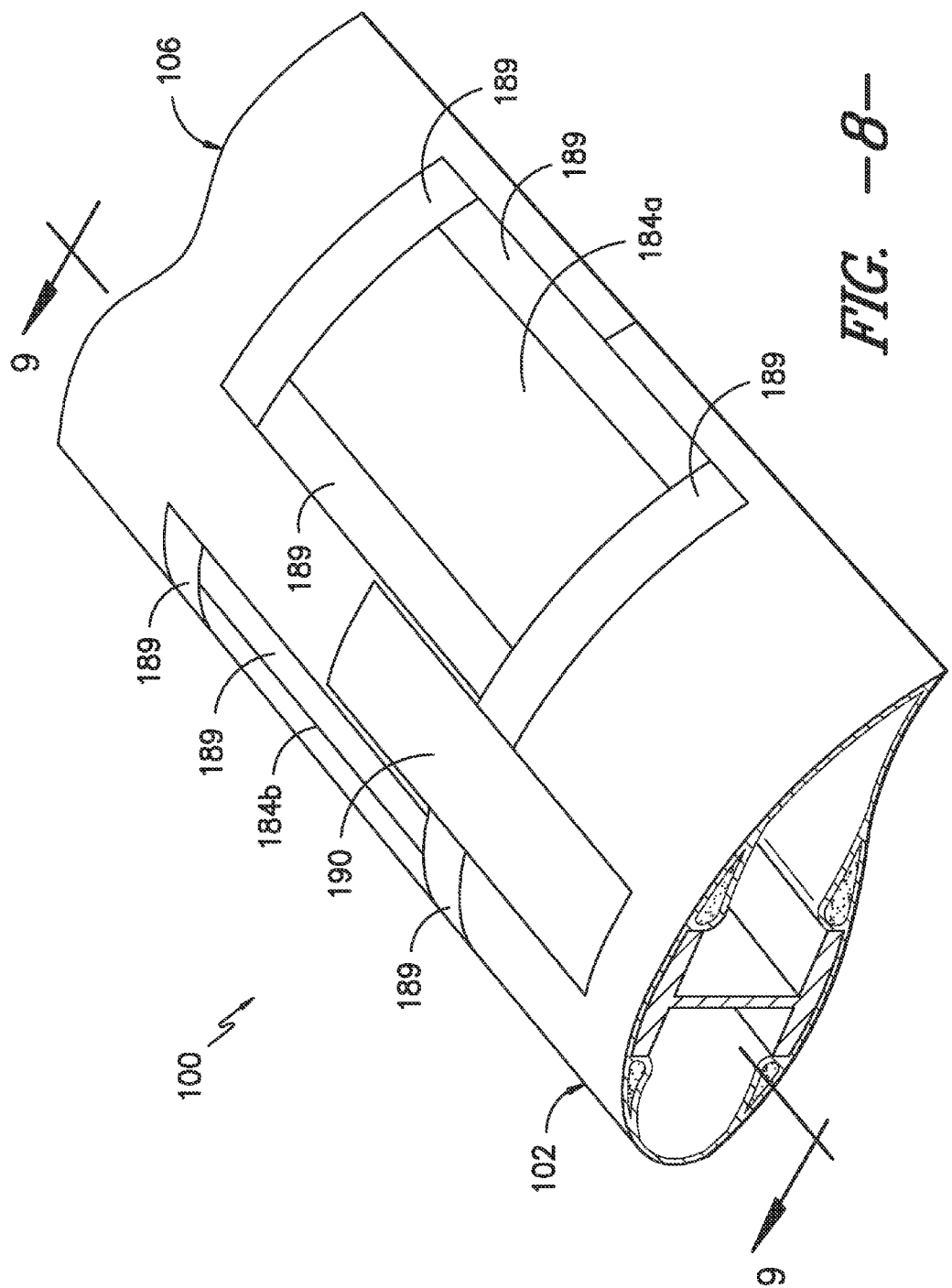
FIG. -8-

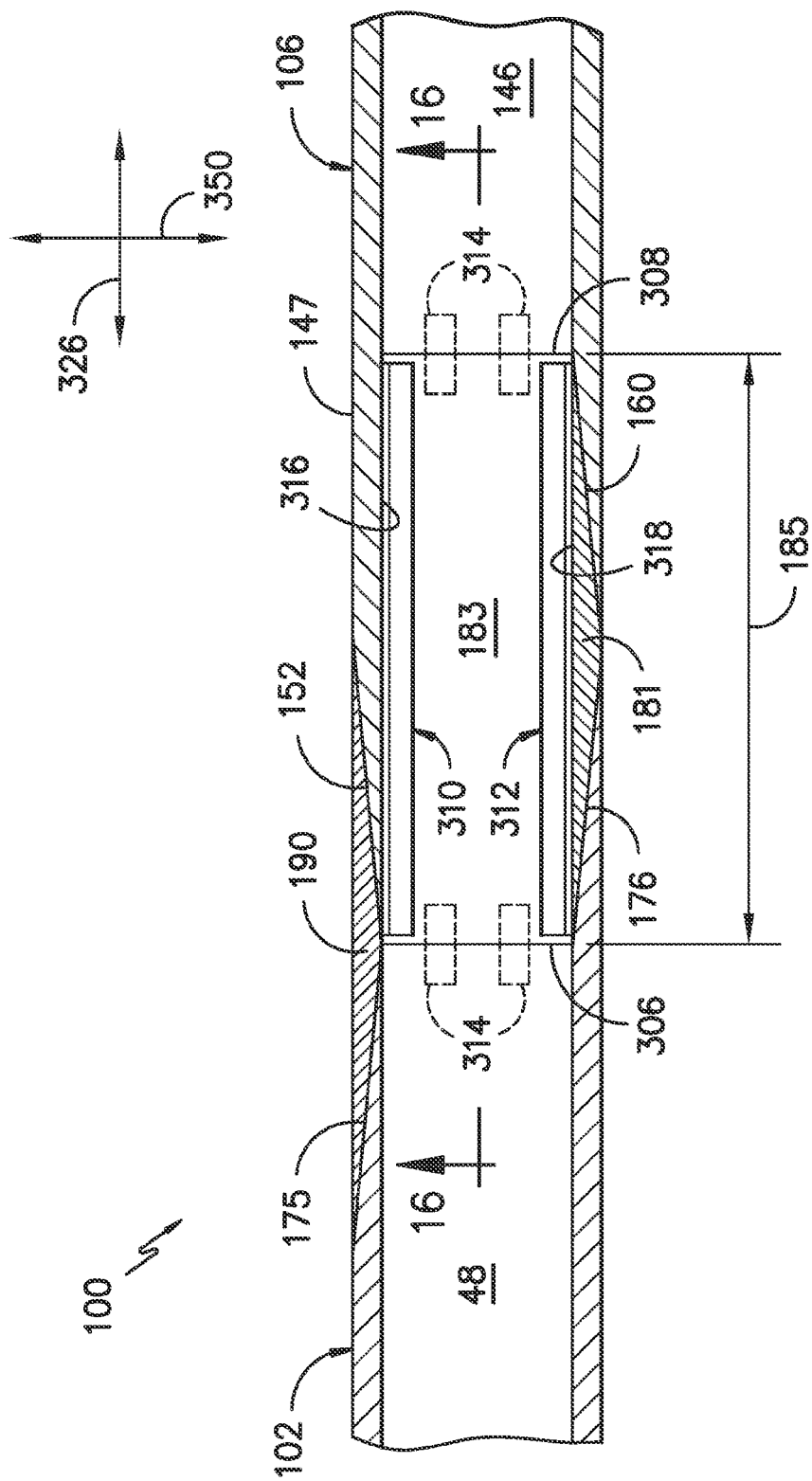
FIG. -9-

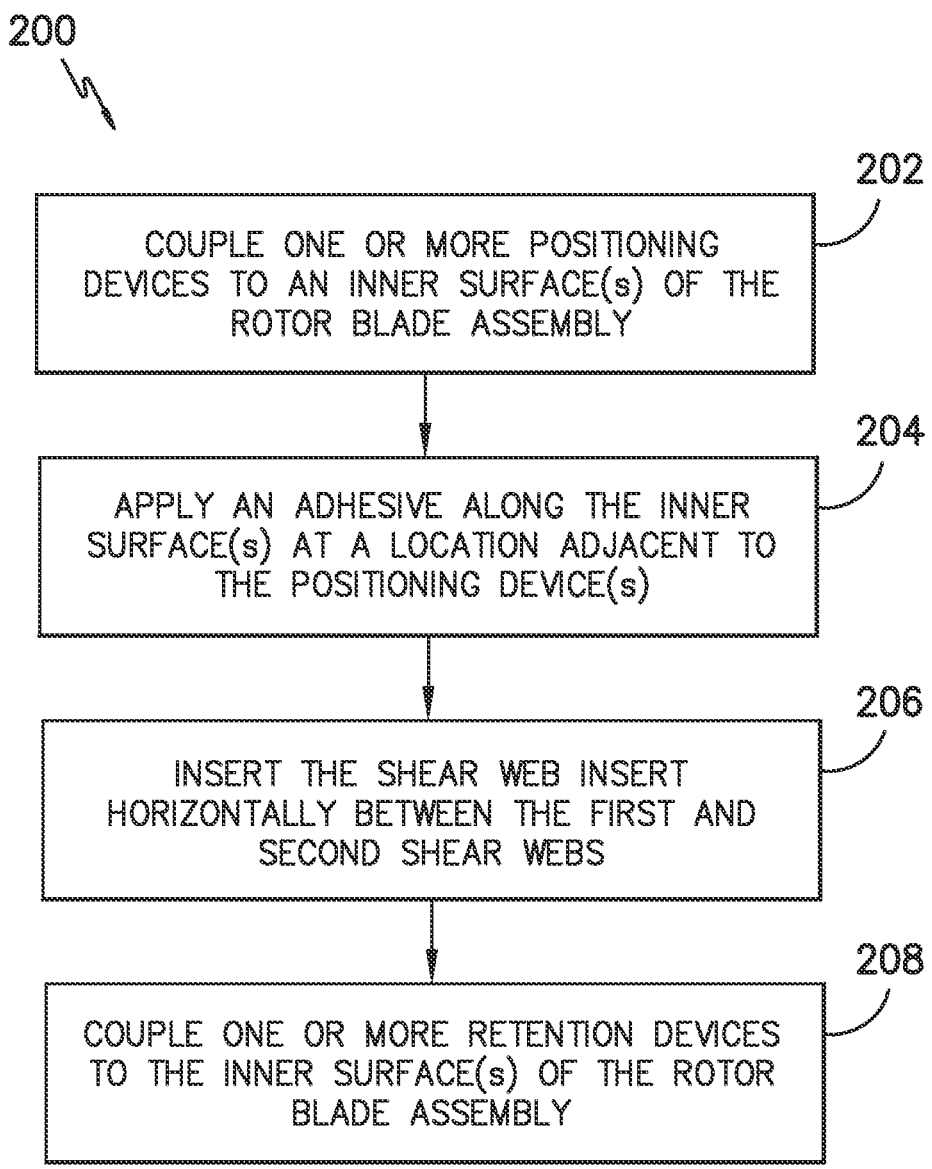
FIG. —10—

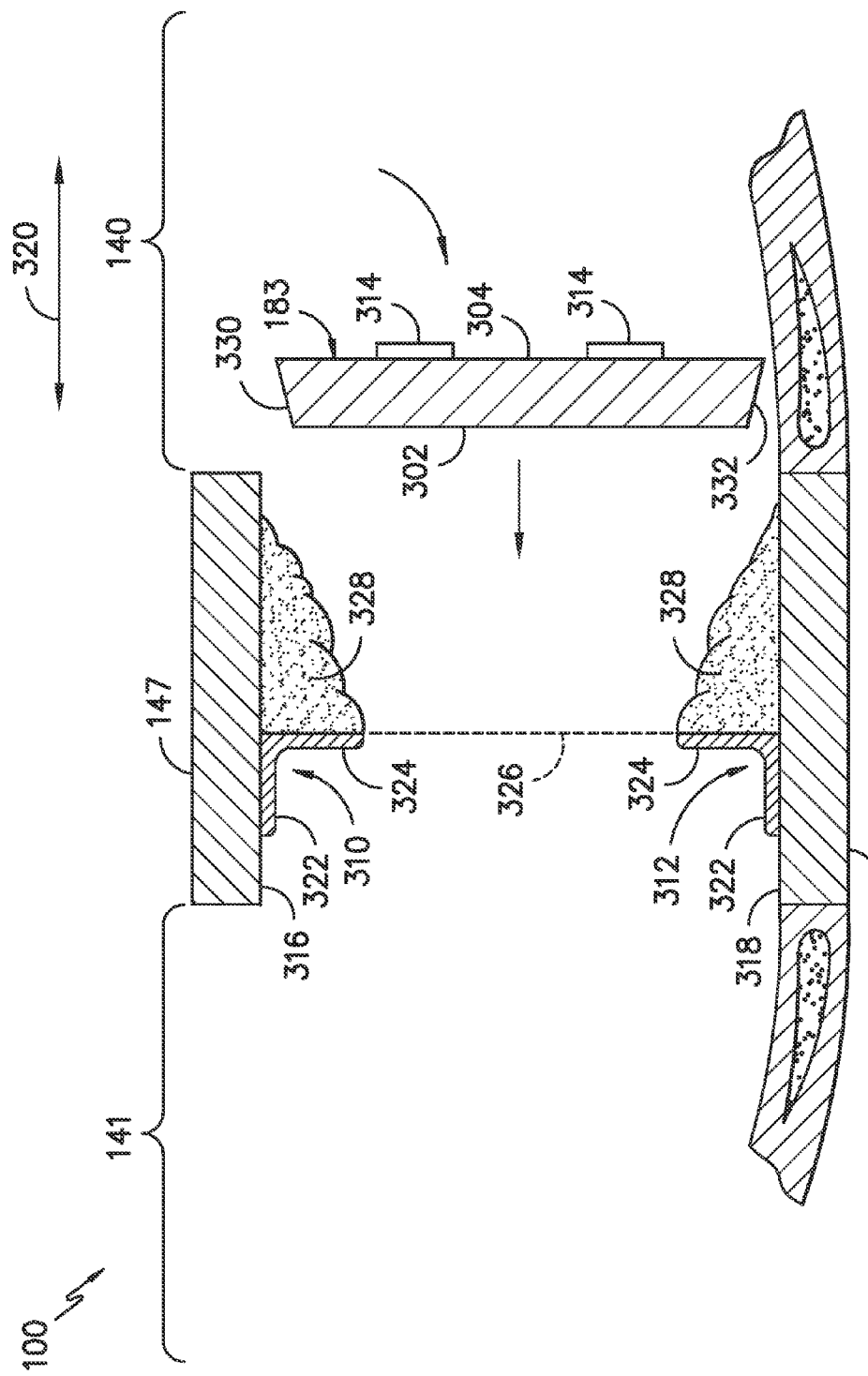

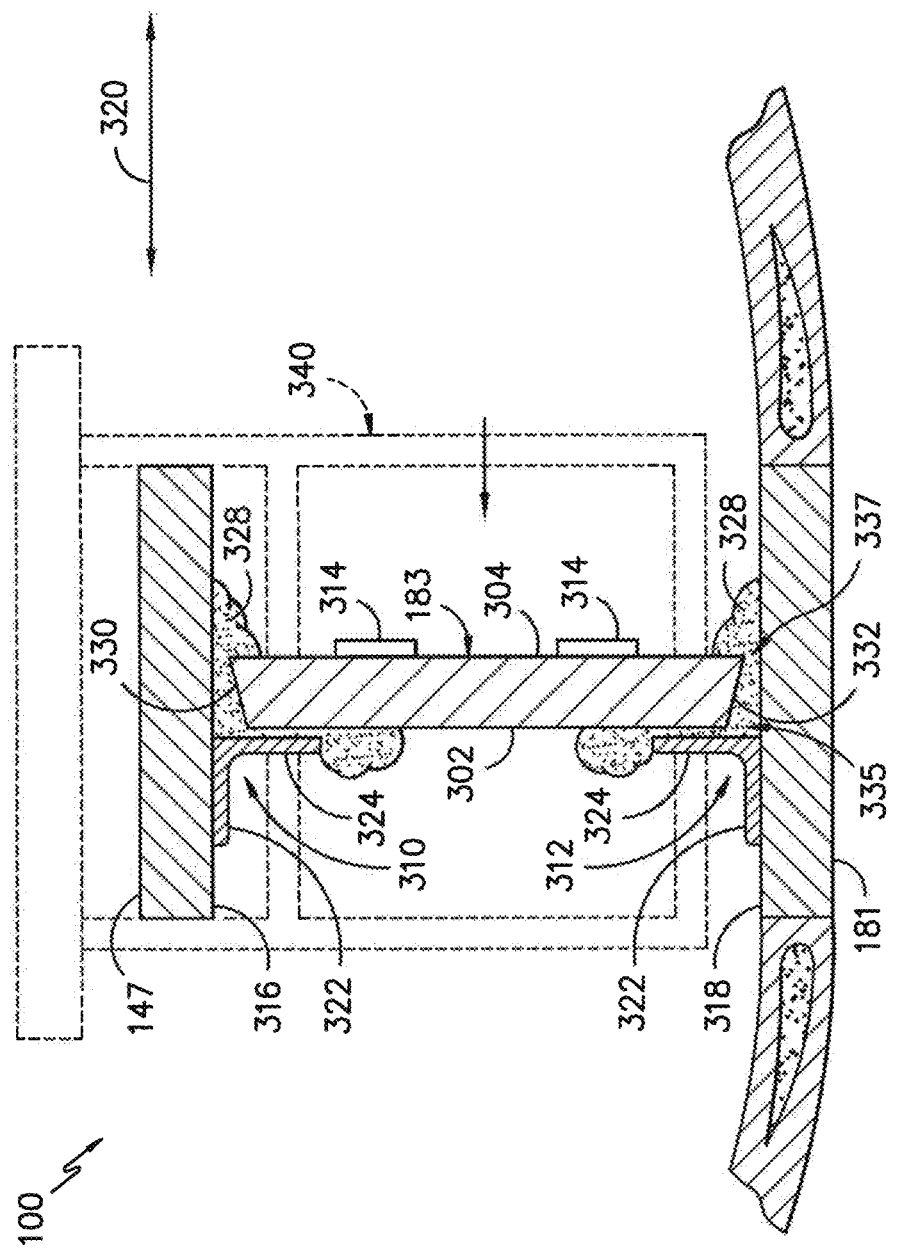
FIG. -12-

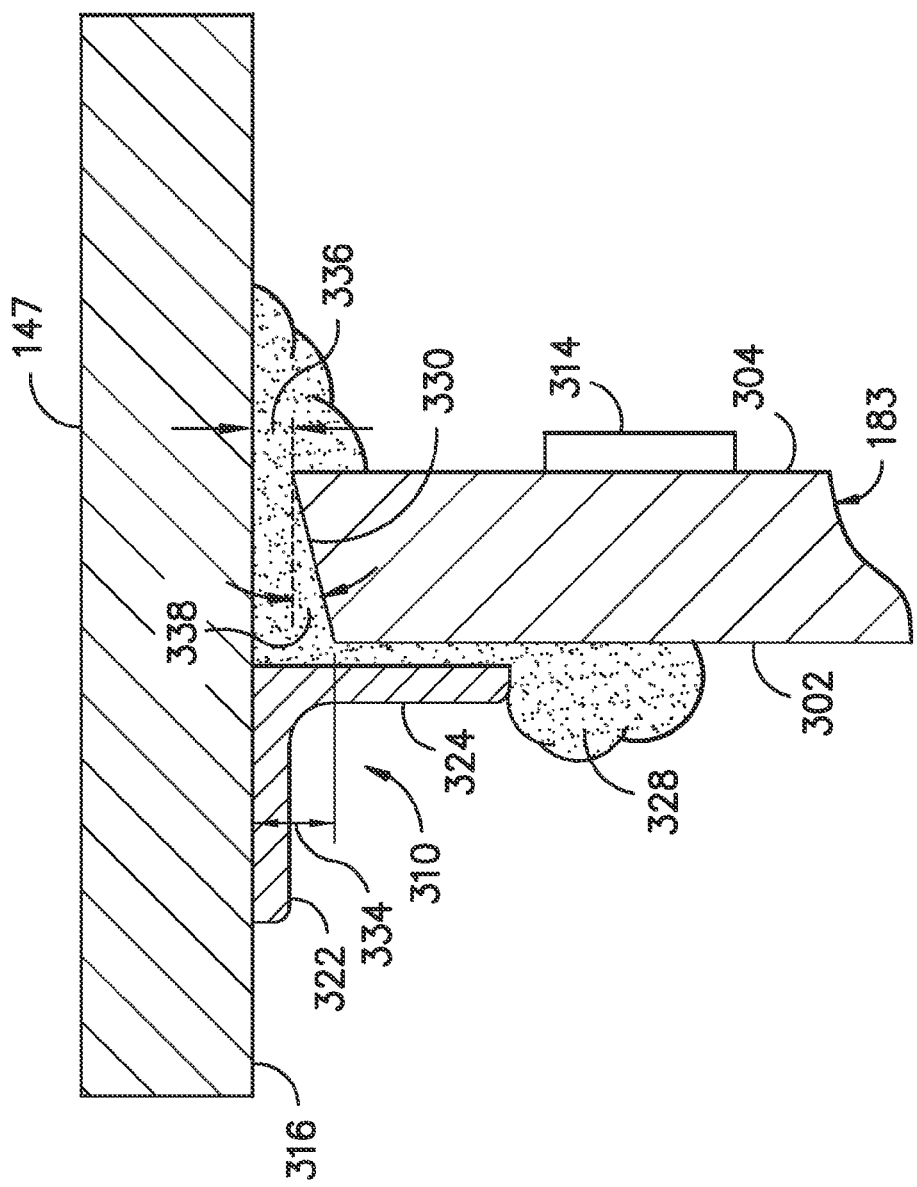

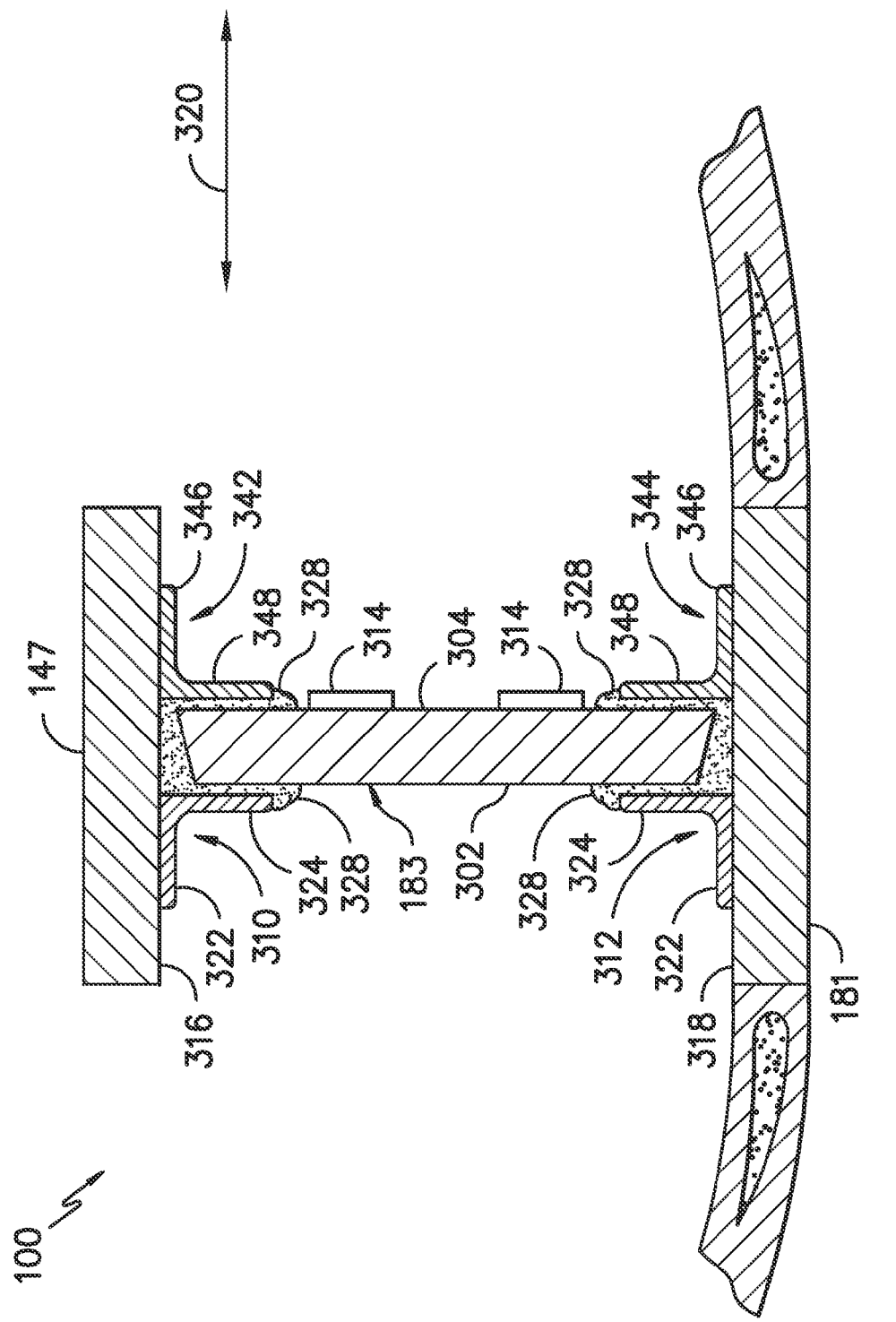
FIG. -14-

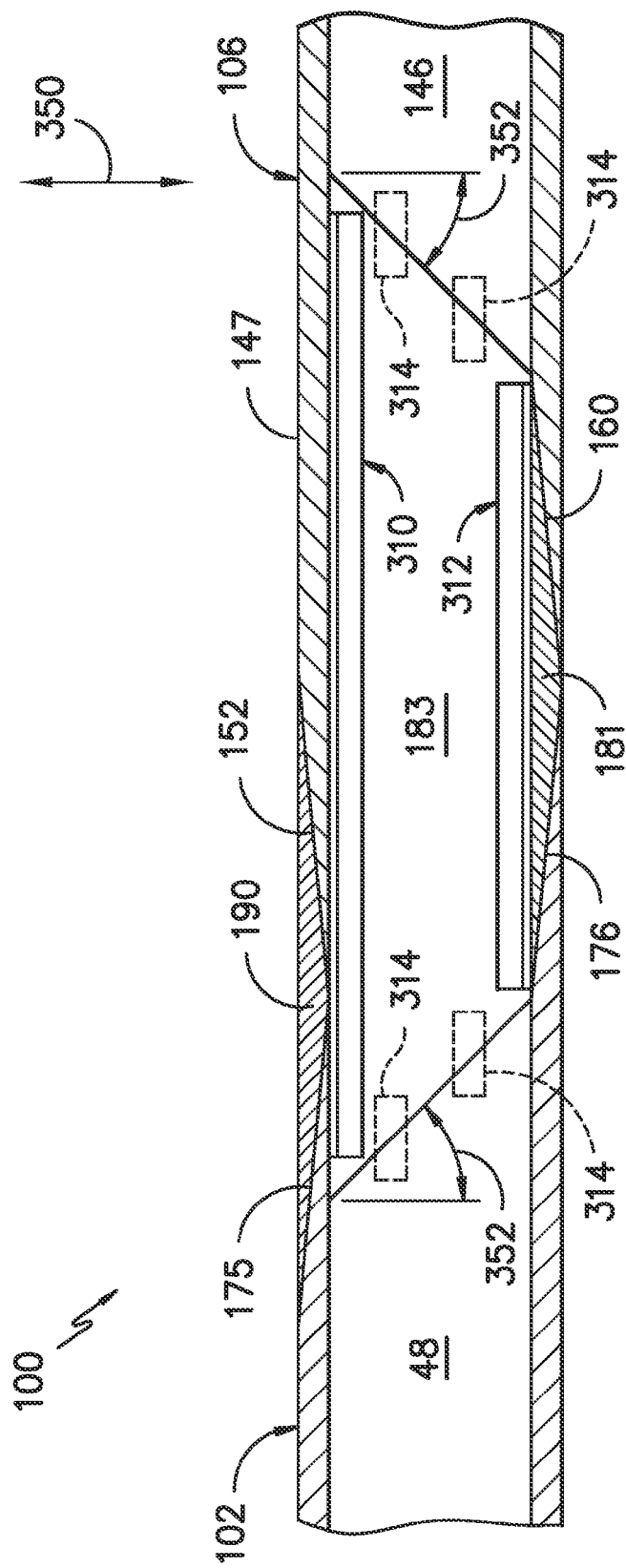
FIG. -15-

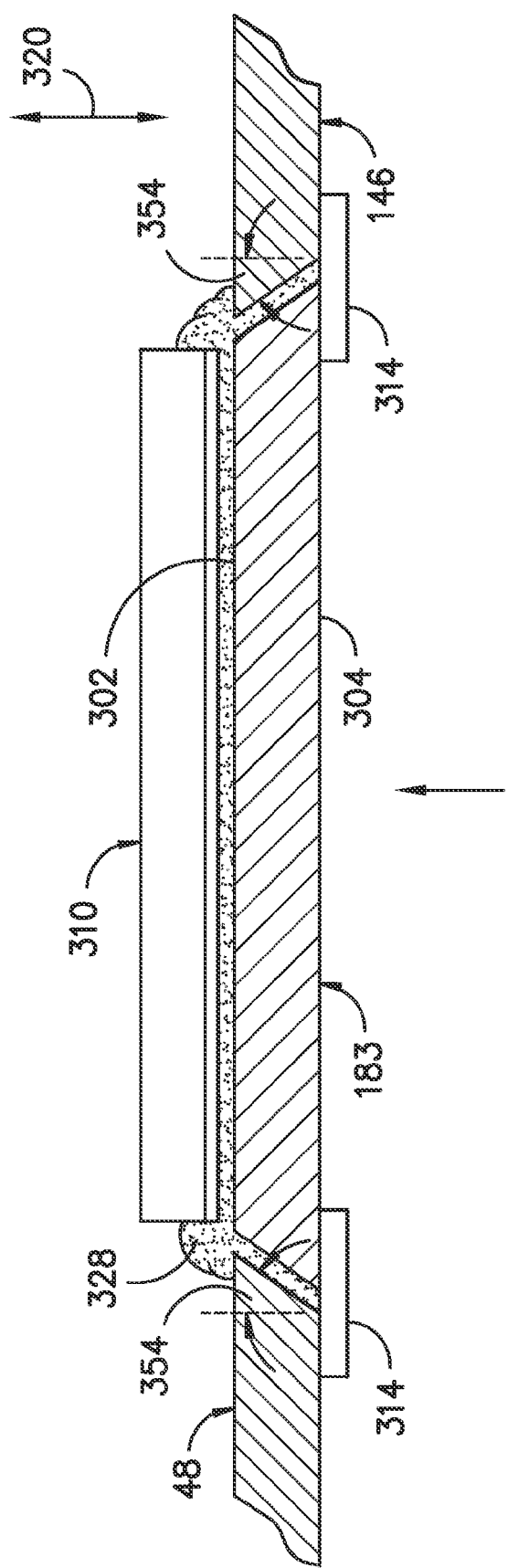
FIG. -16-

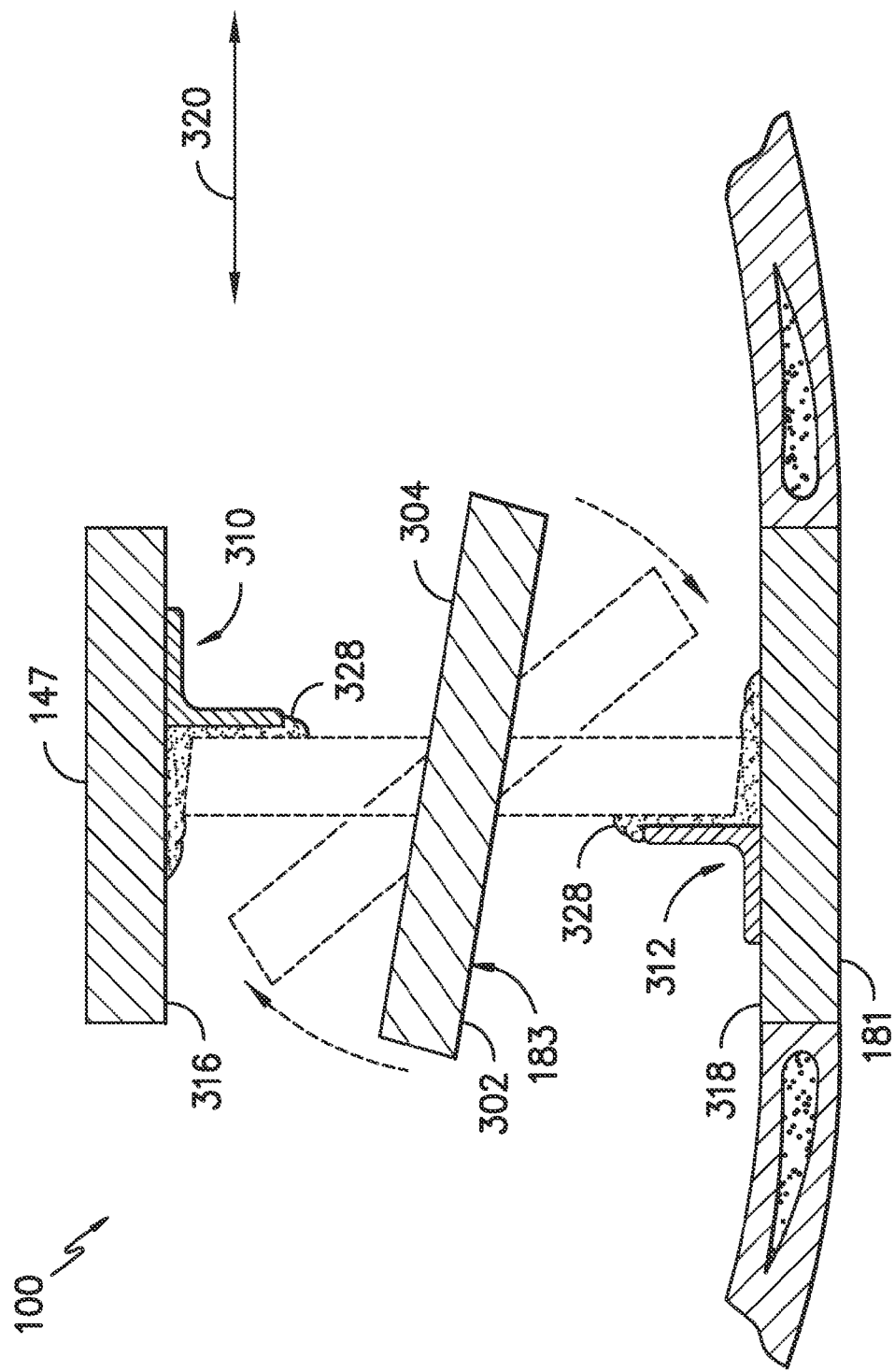
FIG. -17-

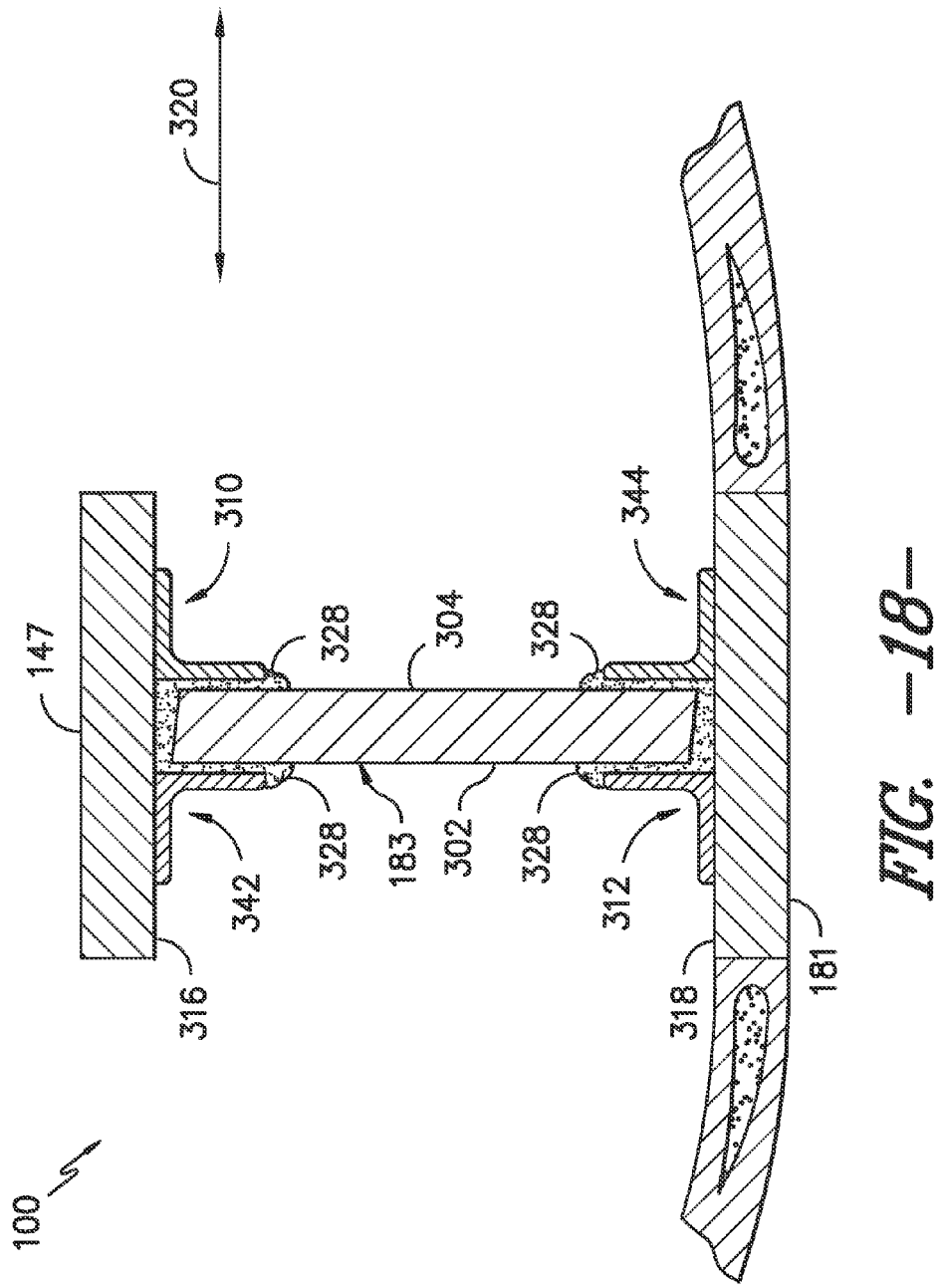

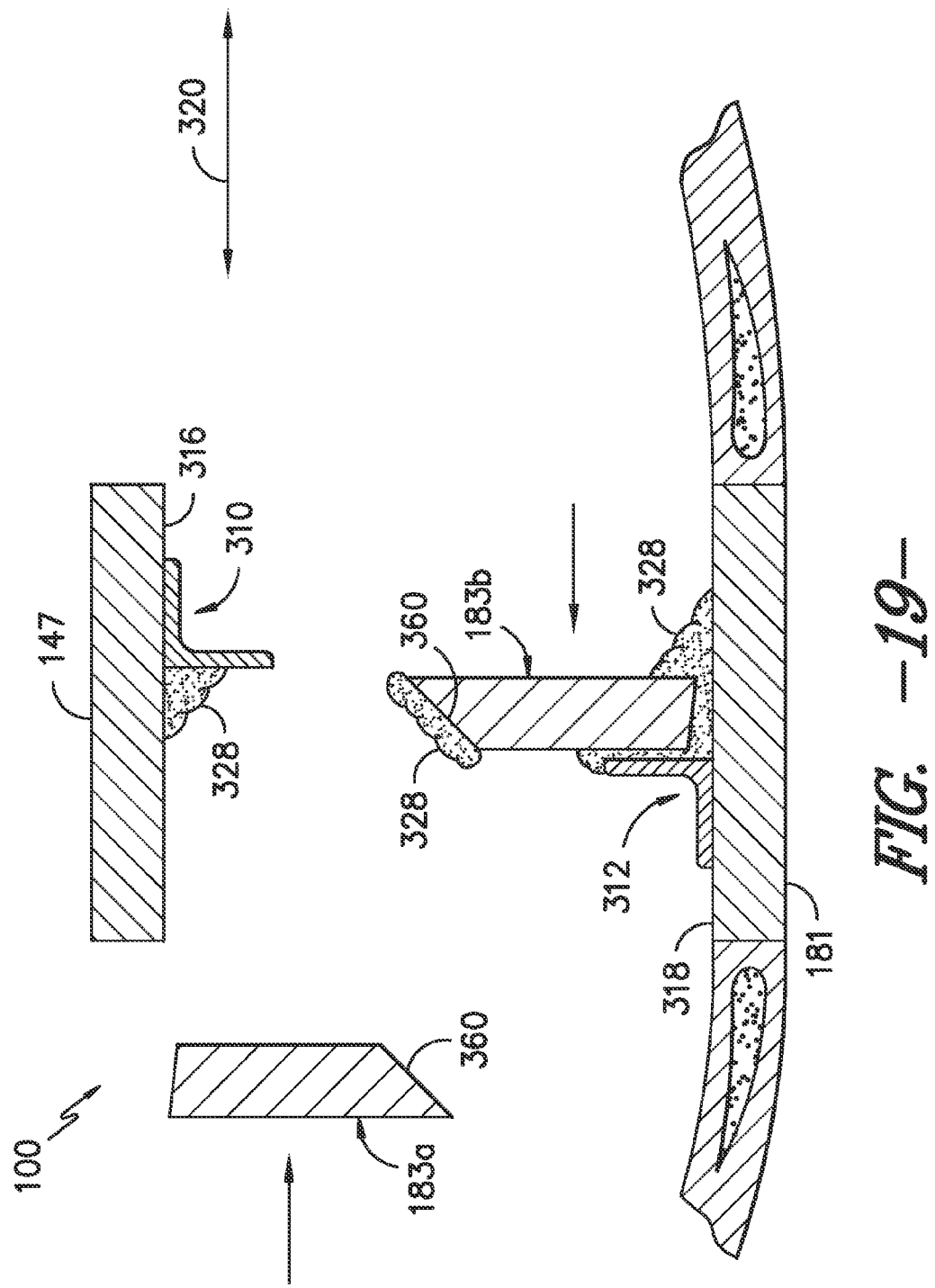

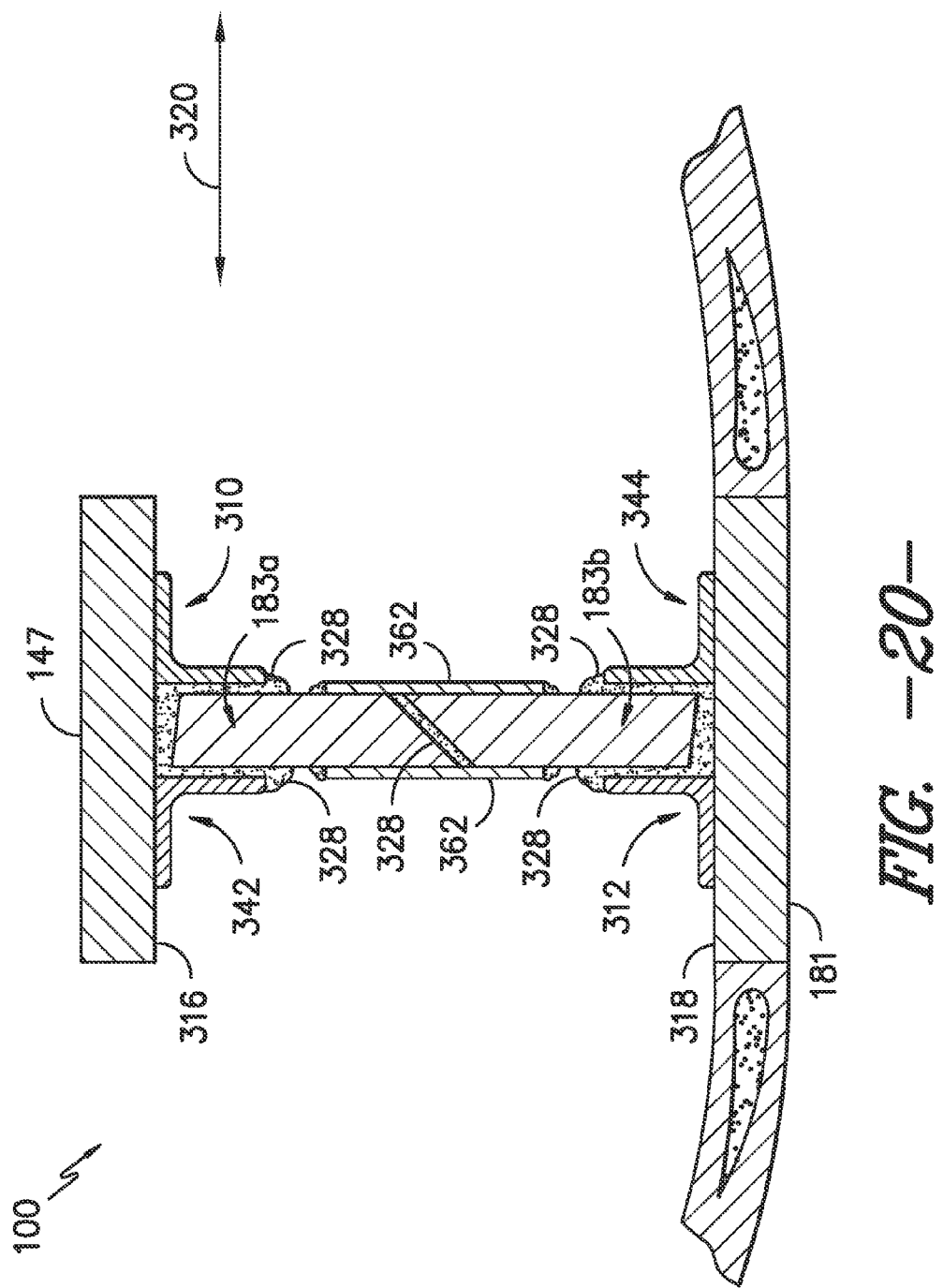

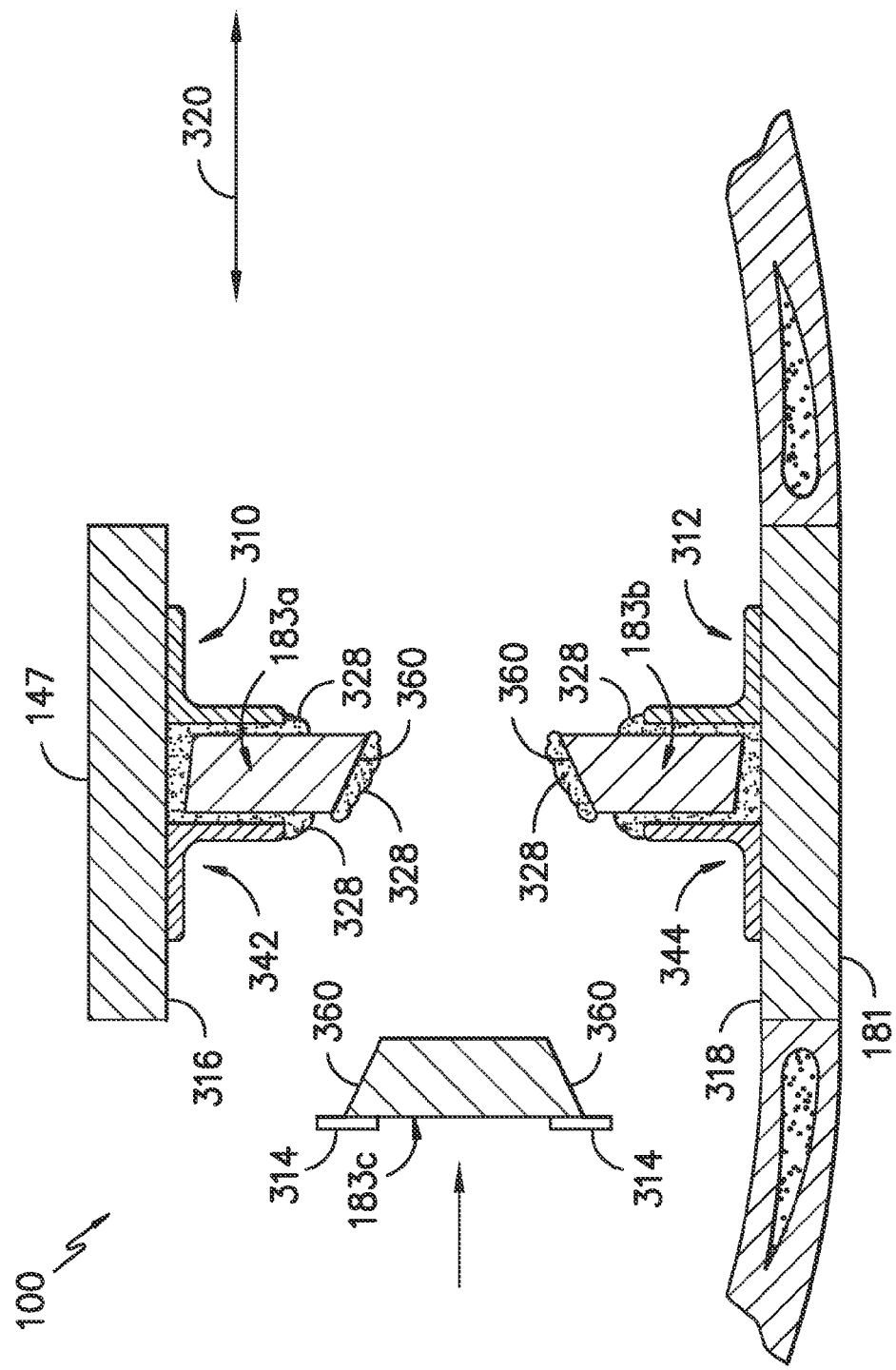
FIG. -21-

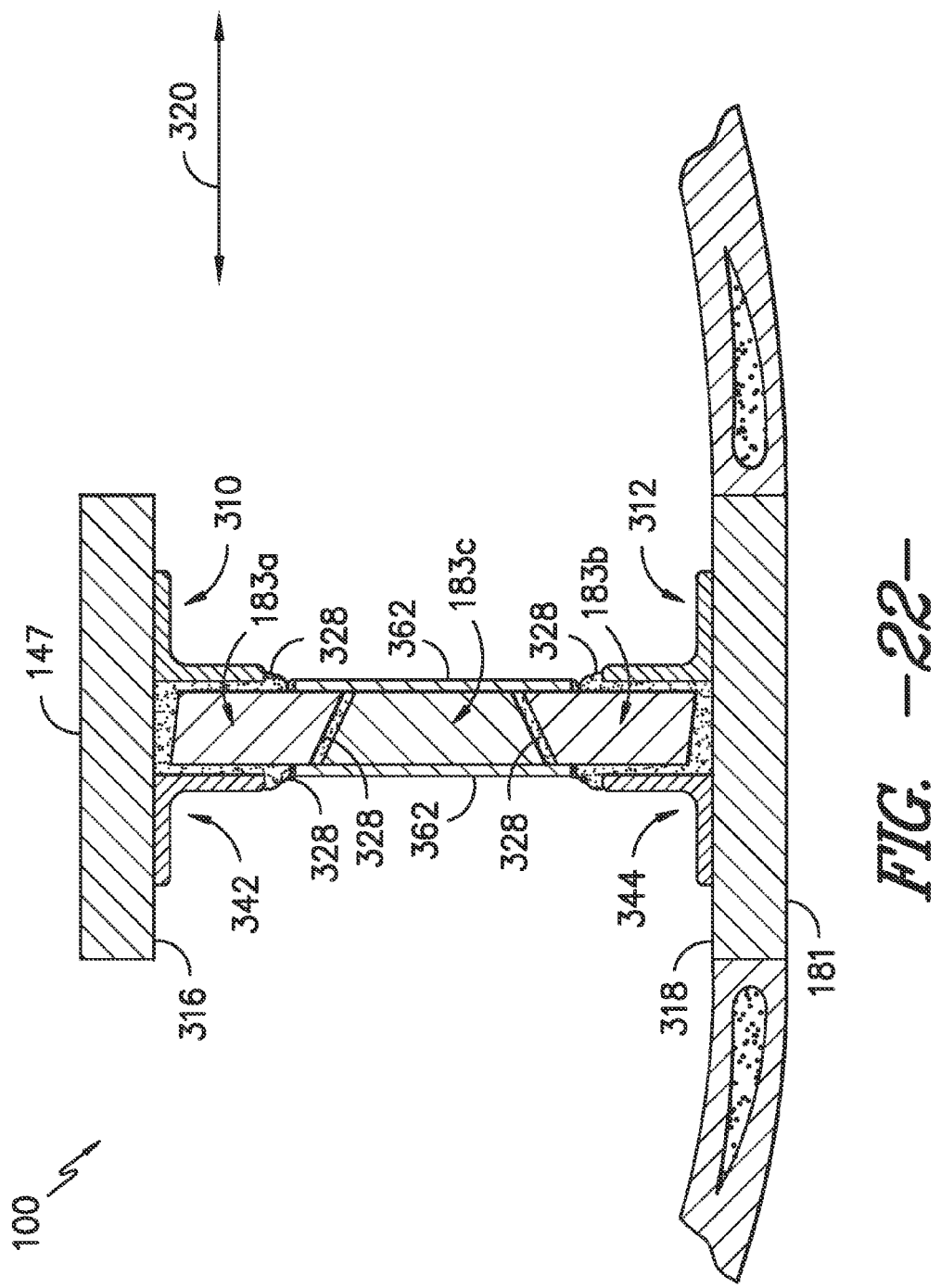

METHOD FOR INSTALLING A SHEAR WEB INSERT WITHIN A SEGMENTED ROTOR BLADE ASSEMBLY

FIELD OF THE INVENTION

The present subject matter relates generally to wind turbines and, more particularly, to a method for installing a shear web insert within a segmented rotor blade assembly.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally known, the deflection of a rotor blade is a function of blade length, along with wind speed, turbine operating states and blade stiffness. Thus, longer rotor blades may be subject to increased deflection forces, particularly when a wind turbine is operating in high-speed wind conditions. These increased deflection forces not only produce fatigue on the rotor blades and other wind turbine components but may also increase the risk of the rotor blades striking the tower.

In order to increase the length of wind turbine rotor blades without adversely affecting the aerodynamic design, it is known to install tip extensions onto the blades. Typically, a conventional tip extension is installed onto a rotor blade by cutting-off a portion of the blade at its tip and replacing such cut-off portion with the tip extension. However, due to the fact that a portion of the rotor blade must be cut-off and because the elongated rotor blade will be subjected to increased loads, the tip extension must be significantly longer than the actual increase in rotor blade length that can be achieved by installing the extension. For example, a conventional tip extension may often need to have a length of almost half of the original span of the rotor blade to accommodate the increased loading on the blade. As such, due to their length, the costs of manufacturing and transporting conventional tip extensions can be prohibitively expensive.

Accordingly, a blade insert that can be used to increase the span of a rotor blade by an amount generally corresponding to the overall length of the blade insert would be welcomed in the technology. In addition, a method for installing a shear web insert between such blade insert and an adjacent segment of the rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for installing a shear web insert between a blade segment and a blade insert of a rotor blade assembly. The blade segment may include a first shear web and the blade insert may include a second shear web. The method may generally include coupling a first positioning device along an inner surface of a first side of the rotor blade assembly, inserting the shear web insert horizontally between the first and second shear webs until a first side face of the shear web insert engages the first positioning device and coupling a first retention device along the inner surface of the first side of the rotor blade assembly so that the first retention device is positioned adjacent to a second side face of the shear web insert, wherein the second side face is opposite the first side face.

In another aspect, the present subject matter is directed to a rotor blade assembly for a wind turbine. The rotor blade assembly may include a blade segment defining a joint end and a blade insert coupled to the joint end. The blade segment may include a first shear web and the blade insert may include a second shear web. The rotor blade assembly may also include a shear web insert extending between the first and second shear webs. The shear web insert may define a first side face and a second side face disposed opposite the first side face. In addition, the rotor blade assembly may include a first positioning device coupled to an inner surface of at least one of the blade segment or the blade insert along a first side of the rotor blade assembly. The first positioning device may be configured to engage the first side face of the shear web insert. The rotor blade assembly may further include a first retaining device coupled to the inner surface along the first side of the rotor blade assembly. The first retaining device may be positioned adjacent to the second side face of the shear web insert.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective view of one embodiment of one of the rotor blades of the wind turbine shown in FIG. 1;

FIG. 3 illustrates an exploded view of one embodiment of a rotor blade assembly in accordance with aspects of the present subject matter;

FIG. 4 illustrates a perspective view of one embodiment of a blade insert configuration that may be utilized with the disclosed rotor blade assembly in accordance with aspects of the present subject matter;

FIG. 5 illustrates a cross-sectional view of a portion of the blade insert shown in FIG. 4 taken about line 5-5;

FIG. 6 illustrates a perspective view of one embodiment of a blade segment configuration that may be utilized with the disclosed rotor blade assembly in accordance with aspects of the present subject matter;

FIG. 7 illustrates an exploded view of a portion of one embodiment of the disclosed rotor blade assembly, particularly illustrating the rotor blade assembly including the blade insert shown in FIGS. 4 and 5 and the blade segment shown in FIG. 6;

FIG. 8 illustrates a perspective, assembled view of the components shown in FIG. 7;

FIG. 9 illustrates a cross-sectional view of a portion of the rotor blade assembly shown in FIG. 8 taken about line 8-8;

FIG. 10 illustrates a flow diagram of one embodiment of a method for installing a shear web insert within the rotor blade assembly shown in FIGS. 7-9;

FIG. 11 illustrates a partially assembled, cross-sectional view of a portion of the rotor blade assembly shown in FIGS. 7-9, particularly illustrating aspects of the installation of the shear web insert within the rotor blade assembly;

FIG. 12 illustrates another partially assembled, cross-sectional view of a portion of the rotor blade assembly shown in FIGS. 7-9, particularly illustrating additional aspects of the installation of the shear web insert within the rotor blade assembly;

FIG. 13 illustrates a close-up view of a portion of the rotor blade assembly shown in FIG. 12;

FIG. 14 illustrates yet another partially assembled, cross-sectional view of a portion of the rotor blade assembly shown in FIGS. 7-9, particularly illustrating additional aspects of the installation of the shear web insert within the rotor blade assembly;

FIG. 15 illustrates a cross-sectional view showing a variation of the embodiment of the rotor blade assembly shown in FIG. 9;

FIG. 16 illustrates a cross-sectional view of the rotor blade assembly shown in FIG. 9 taken about line 16-16;

FIG. 17 illustrates a partially assembled, cross-sectional view of a portion of the rotor blade assembly shown in FIGS. 7-9, particularly illustrating another aspect of the installation of the shear web insert within the rotor blade assembly;

FIG. 18 illustrates a partially assembled, cross-sectional view of a portion of the rotor blade assembly shown in FIGS. 7-9, particularly illustrating aspects of the installation of the shear web insert within the rotor blade assembly;

FIG. 19 illustrates a partially assembled, cross-sectional view of a portion of the rotor blade assembly shown in FIGS. 7-9, particularly illustrating an aspect of the installation of a two-piece shear web insert within the rotor blade assembly;

FIG. 20 illustrates a partially assembled, cross-sectional view of a portion of the rotor blade assembly shown in FIGS. 7-9, particularly illustrating additional aspects of the installation of the two-piece shear web insert shown in FIG. 19;

FIG. 21 illustrates a partially assembled, cross-sectional view of a portion of the rotor blade assembly shown in FIGS. 7-9, particularly illustrating an aspect of the installation of a three-piece shear web insert within the rotor blade assembly; and FIG. 22 illustrates a partially assembled, cross-sectional view of a portion of the rotor blade assembly shown in FIGS. 7-9, particularly illustrating additional aspects of the installation of the three-piece shear web insert shown in FIG. 21.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method for installing a shear web insert between a blade segment and a blade insert of a rotor blade assembly. Specifically, in several embodiments, the blade segment and the blade insert may each include a shear web extending longitudinally therein. However, due to the configuration of the blade insert and/or the blade segment, a gap may be defined between the shear webs of such components. As a result, a shear web insert must be installed across the gap defined between the shear webs. As will be described below, the blade insert may, in several embodiments, include an elongated projection generally aligned with one of its spar caps that extends to the blade segment, thereby preventing the shear web insert from being installed vertically between the shear webs. Thus, in accordance with aspects of the present subject matter, the disclosed method may be utilized to install the shear web insert horizontally between the shear webs.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one of the rotor blades 22 shown in FIG. 1 is illustrated. As shown, the rotor blade 22 generally includes a blade root 24 configured for mounting the rotor blade 22 to the hub 20 of the wind turbine 10 (FIG. 1) and a blade tip 26 disposed opposite the blade root 24. A body 28 of the rotor blade 22 may generally be configured to extend between the blade root 24 and the blade tip 26 and may serve as the outer casing/skin of the blade 22. In several embodiments, the body 28 may define a substantially aerodynamic profile, such as by defining a symmetrical or cambered airfoil-shaped cross-section. As such, the body 28 may include a pressure side 30 and a suction side 32 extending between a leading edge 34 and a trailing edge 36. Further, the rotor blade 22 may have a span 38 defining the total length between the blade root 22 and the blade tip 24 and a chord 40 defining the total length between the leading edge 34 and the trailing edge 36. As is generally understood, the chord 40 may vary in length with respect to the span 38 as the rotor blade 22 extends from the blade root 22 to the blade tip 24.

In several embodiments, the body 28 of the rotor blade 22 may be formed as a single, unitary component. Alternatively, the body 28 may be formed from a plurality of shell components. For example, the body 28 may be manufactured from a first shell half generally defining the pressure side 30 of the rotor blade 22 and a second shell half generally defining the suction side 32 of the rotor blade 20, with the shell halves being secured to one another at the leading and trailing edges 34, 36 of the blade 22. Additionally, the body 28 may generally be formed from any suitable material. For instance, in one embodiment, the body 28 may be formed entirely from a laminate composite material, such as a carbon fiber reinforced laminate composite or a glass fiber reinforced laminate composite. Alternatively, one or more portions of the body 28 may be configured as a layered construction and may include a core material 42 (e.g., as shown in FIG. 4), formed from a lightweight material such as wood (e.g., balsa), foam (e.g., extruded polystyrene foam) or a combination of such materials, disposed between layers of laminate composite material.

It should be appreciated that the rotor blade 22 may also include one or more longitudinally extending structural components configured to provide increased stiffness, buckling resistance and/or strength to the rotor blade 22. For example, in several embodiments, the rotor blade 22 may include a pair of spar caps (e.g., a top spar cap 44 and a bottom spar cap 46) and one or more shear webs 48 extending between the opposed spar caps 44, 46 (e.g., as shown in FIG. 6).

Referring now to FIG. 3, one embodiment of a rotor blade assembly 100 is illustrated in accordance with aspects of the present subject matter. As shown, the rotor blade assembly 100 may include a first blade segment 102, a second blade segment 104 and a blade insert 106 configured to be coupled between the first and second blade segments 102, 104. In general, the rotor blade assembly 100 may be configured such that, when the first and second blade segments 102, 104 are coupled together via the blade insert 106, a complete rotor blade is formed.

In several embodiments, the first and second blade segments 102, 104 may be formed by dividing a pre-existing rotor blade 22 into two separate blade sections. For example, as shown in FIG. 2, in one embodiment, the illustrated rotor blade 22 may be divided into the first and second blade segments 102, 104 by cutting the rotor blade 22 along a joint or cut line 108. Thus, in the illustrated embodiment, the first blade segment 102 may correspond to a root segment of the rotor blade 22 and may extend between the blade root 24 and a first joint end 110 formed at the cut line 108. Similarly, in the illustrated embodiment, the second blade segment 104 may correspond a tip segment of the rotor blade 22 and may extend between the blade tip 26 and a second joint end 112 formed at the cut line 108.

It should be appreciated that, although the first blade segment 102 is shown as a root segment and the second blade segment 104 is shown as a tip segment, the terms "first blade segment" and "second blade segment" may generally refer to any suitable segments or sections of the rotor blade 22. For example, in another embodiment, the first blade segment 102 may correspond to a tip segment of the rotor blade 22 and the second blade segment 104 may correspond to a root segment of the rotor blade 22. In a further embodiment, the first and second blade segments 102, 104 may correspond to shorter segments of the rotor blade 22.

Additionally, it should be appreciated that, as used herein, the terms "first blade segment" and "second blade segment" need not be limited to a single, continuous blade segment. For example, in the illustrated embodiment, the first blade segment 102 may be formed from a single, unitary blade segment extending between the blade root 24 and the first joint end 110 or the first blade segment 102 may be formed from two or more blade segments that, when coupled together, extend between blade root 24 and the first joint end 110. Similarly, in the illustrated embodiment, the second blade segment 104 may be formed from a single, unitary blade segment extending between the second joint end 112 and the blade tip 26 or the second blade segment 104 may be formed from two or more blade segments that, when coupled together, extend between the second joint end 112 and the blade tip 26.

Moreover, it should be appreciated that the cut line 108 (FIG. 2) may generally be located at any suitable position along the span 38 of the rotor blade 22. For example, in one embodiment, the distance of the cut line 108 from the blade root 24 may range from about 40% to about 95% of the span 38, such as from about 40% to about 80% of the span 28 or from about 50% to about 65% of the span 38. However, it is foreseeable that, in other embodiments, the distance of the cut line 108 from the blade root 34 may be less than 40% of the span 38 or greater than 95% of the span 38.

It should also be appreciated that, in alternative embodiments, the first and second blade segments 102, 104 need not be formed by cutting or otherwise dividing a pre-existing rotor blade 22 into two separate blade sections. For example, in another embodiment, the first and second blade segments 102, 104 may be separately manufactured and assembled together with the blade insert 106 to form the disclosed rotor blade assembly 100.

Referring still to FIG. 3, the blade insert 106 of the rotor blade assembly 100 may generally comprise an elongated, aerodynamic body 114 extending between a forward end 116 and an aft end 118, thereby forming a separate blade segment of the rotor blade assembly 100. In general, the blade insert 106 may be configured to be coupled between the first and second blade segments 102, 104 in order to form the rotor blade assembly 100. Specifically, the forward end 116 of the blade insert 106 may be configured to be coupled to the joint end 110 of the first blade segment 102 and the aft end 118 of the blade insert 106 may be configured to be coupled to the joint end 112 of the second blade segment 104. Suitable configurations and methods for attaching the blade insert 106 between the first and second blade segments 102, 104 will generally be described below with reference to FIGS. 4-16.

Referring now to FIGS. 4-6, one embodiment of a particular blade insert/segment configuration that may be used to effectively and efficiently secure a blade insert 106 between first and second blade segments 102, 104 of a rotor blade assembly 100 is illustrated in accordance with aspects of the present subject matter. Specifically, FIG. 4 illustrates a perspective view of the blade insert 106 and FIG. 5 illustrates a partial, cross-sectional view of the blade insert 106 shown in FIG. 4 taken about line 5-5. Additionally, FIG. 6 illustrates a perspective view of a corresponding configuration that may be used for the first blade segment 102 and/or the second blade segment 104.

As indicated above, the blade insert 106 may generally include an elongated body 114 extending spanwise between a forward end 116 and an aft end 118, with the forward end 116 configured to be coupled to the joint end 110 of the first blade segment 102 and the aft end 118 being configured to be coupled to the joint end 112 of the second blade segment 104. In general, the body 114 may be configured to define a substantially aerodynamic profile, such as by defining a symmetric or cambered airfoil-shaped cross-section. Thus, as shown in FIGS. 4 and 5, the body 114 may include a top side 120 (e.g., a pressure side) and a bottom side 122 (e.g., suction side) extending between a leading edge 124 and a trailing edge 126. Additionally, as shown, the top side 120 of the body 114 may be configured to extend spanwise between a forward edge 128 disposed at the forward end 116 of the blade insert 106) and an aft edge 130 disposed at the aft end 118 of the blade insert 106. Similarly, the bottom side 122 of the body 114 may be configured to extend spanwise between a forward edge 132 (disposed at the forward end 116 of the blade insert 106 and an aft edge 134 disposed at the aft end 118 of the blade insert 106.

The blade insert 106 may also include the same or similar internal structural components as the first and second blade segments 102, 104. For example, as shown in FIG. 4, the blade insert 106 may include a pair of longitudinally extending spar caps (e.g., a top spar cap 142 and a bottom spar cap 144), with each spar cap 142, 144 being integrated into and/or forming part of either the top side 120 or the bottom side 122 of the blade insert 106. In addition, the blade insert 106 may include one or more shear webs 146 (FIG. 5) extending between the opposed spar caps 142, 144.

Additionally, in several embodiments, a portion of the top side 120 of the blade insert 106 may be recessed or offset from the forward and aft edges 132, 134 of the bottom side 122 of the blade insert 106. For example, as shown in FIG. 4, portions of the top side 120 may be inwardly offset from the forward edge 132 of the bottom side 122 by a first spanwise distance 136 along either side of the top spar cap 142, thereby defining separate offset portions of the forward edge 128 of the top side 120. Similarly, portions of the top side 120 may also be inwardly offset from the aft edge 134 of the bottom side 122 by a second spanwise distance 138 along either side of the top spar cap 142, thereby defining separate offset portions of the aft edge 130 of the top side 120. As will be described below, by offsetting portions of the top side 120 as shown in FIG. 4, separate access windows 140, 141 may be defined at each end 116, 118 of the blade insert 106 when the insert 106 is positioned between the first and second blade segments 102, 104. Such access windows 140, 141 may generally allow for service workers to access the interior of the rotor blade assembly 100, thereby allowing various components to be positioned within the assembly 100 to facilitate securing the blade insert 106 between the blade segments 102, 104. For example, as will be described below, a shear web insert 183 may be inserted through one of the access windows 140, 141 and installed horizontally between the blade insert 106 and the blade segment 102 to couple the shear web 48 of the blade segment 102 to the shear web 146 of the blade insert 106.

It should be appreciated that the first and second spanwise distances 136, 138 may generally correspond to any suitable distance. Additionally, in one embodiment, the first spanwise distance 136 may be equal to the second spanwise distance 138. Alternatively, the first spanwise distance 136 may be greater or less than the second spanwise distance 138.

It should also be appreciated that, as used herein, the terms "forward" and "aft" are simply used to distinguish the opposed ends 110, 112 and/or edges 128, 130, 132, 134 of the blade insert 106. Thus, although the forward end 110 of the blade insert 106 is described herein as being configured to be coupled to the joint end 110 of the first blade segment 102, the aft end 112 of the blade insert 106 may instead be configured to be coupled to the first blade segment 102. Similarly, as used herein, the terms "top" and "bottom" are simply used to distinguish the opposed sides 120, 122 of the blade insert 106. For example, in the illustrated embodiment, the top side 120 of the blade insert 106 corresponds to the pressure side while the bottom side 122 corresponds to the suction side. However, in another embodiment, the top side 120 of the blade insert 106 may correspond to the suction side while the bottom side 122 may correspond to the pressure side.

Additionally, in several embodiments, a portion(s) of the top side 120 of the blade insert 106 may also be configured to extend beyond the forward and aft edges 132, 134 of the bottom side 122 of the blade insert 106. Specifically, as shown in FIGS. 4 and 5, elongated portions 147 of the top side 120 (generally aligned with the top spar cap 142) may extend beyond the forward and aft edges 132, 134 of the bottom side 122, thereby defining extended portions of the forward and aft edges 128, 130 of the top side 120. As will be described below, such elongated portions 147 of the top side 120 may be configured to extend to a location at and/or adjacent to the joint ends 110, 112 of the blade segments 102, 104 when the blade insert 106 is positioned between the blade segments 102, 104.

Moreover, in several embodiments, one or more tapered or scarfed sections may be defined along the top and bottom sides 120, 122 of the blade insert 106. For example, as shown in FIG. 4, first and second top scarfed sections 152, 154 may be defined along the outer surface of the top side 120, with the first top scarfed section 152 extending from an inner edge 156 to the forward edge 128 of the elongated portion 147 of the top side 120 and the second top scarfed section 154 extending from an inner edge 158 to the aft edge 130 of the elongated portion 147 of the top side 120. Similarly, as shown in FIG. 4, first and second bottom scarfed sections 160, 162 may be defined along the inner surface of the bottom side 122, with the first bottom scarfed section 160 extending from an inner edge 164 to the forward edge 132 of the bottom side 122 and the second top scarfed section 162 extending from an inner edge (not shown) to the aft edge 134 of the bottom side 122. In such an embodiment, each scarfed section 152, 154, 160, 162 may be configured to taper outwardly from its inner edge 156, 158, 164 (i.e., with the height of each scarfed section 152, 154, 160, 162 increasing from its inner edge 156, 158, 164 to the respective forward or aft edges 128, 130, 132, 134 of the top and bottom sides 120, 122 of the blade insert 106).

It should be appreciated that the scarfed sections 152, 154, 160, 162 may generally be defined at any suitable chordwise location along the top and bottom sides 120, 122 of the blade insert 106. However, in several embodiments, the scarfed sections 152, 154, 160, 162 may be aligned with the spar caps 142, 144 of the blade insert 106. For example, as shown in FIG. 4, the top scarfed sections 152, 154 are generally aligned with the top spar cap 142 while the bottom scarfed sections 160, 162 are generally aligned with the bottom spar cap 144. In such an embodiment, a width 168 (FIG. 4) of each scarfed section 152, 154, 160, 162 may generally correspond to the width of the spar caps 142, 144. Alternatively, the width 168 of each scarfed section 152, 154, 160, 162 may be greater or less than the width of the spar caps 142, 144.

Moreover, a portion of the shell(s) forming the blade insert 106 may be recessed relative to the forward and aft edges 128, 130, 132, 134 of the top and bottom sides 120, 122. For example, as shown in FIG. 4, only an inner layer of the top side shell (e.g., one or more layers of laminate composite) may extend to the forward and aft edges 128, 130 of the top side 120 while only an outer layer of the bottom side shell (e.g., one or more layers of laminate composite) may extend to the forward and aft edges 132, 134 of the bottom side 122, thereby defining top and bottom flanges 172, 174 extending across portions of such edges 128, 130, 132, 134. As will be described below, the top and bottom flanges 172, 174 may facilitate securing the blade insert 106 between the first and second blade segments 102, 104. The outer layers of the shell(s) (e.g., one or more outer layers of laminate composite and/or one or more layers of core material 42) may then be positioned over the flanges 172, 174 to create a smooth surface along the inner and outer surfaces of the rotor blade assembly 100.

Referring now to FIG. 6, a perspective view of a suitable segment configuration for attaching each blade segment 102, 104 to the blade insert 106 shown in FIGS. 4 and 5 is illustrated in accordance with aspects of the present subject matter. Specifically, FIG. 6 illustrates a perspective view of the joint end 110 of the first blade segment 102. However, it should be appreciated that the joint end 112 of the second blade segment 104 may be configured the same as or similar to the joint end 110 shown in FIG. 6.

As shown, the blade segment 102 may be modified to include scarfed sections 175, 176 configured to be aligned with the scarfed sections 152, 160 of the blade insert 106. Specifically, in the illustrated embodiment, the blade segment 102 includes a top scarfed section 175 defined along the outer surface of its pressure side 30 that is configured to be aligned with top scarfed section 152 defined at the forward edge 128 of the top side 120 of the blade insert 106. Similarly, the blade segment 102 includes a bottom scarfed section 176 defined along the inner surface of its suction side 32 that is configured to be aligned with the bottom scarfed section 160 defined at the forward edge 132 of the bottom side 122 of the blade insert 106. As will be described below, a scarfed connector(s) may be positioned across each aligned pair of scarfed sections 152, 160, 175, 176 to provide a means for securing the blade segment 102 to the blade insert 106.

Additionally, similar to the blade insert 106, the blade segment 102 may include an offset edge(s) 177 at its joint end 110 that is offset from the edge(s) of the opposing side of the blade segment 102 by a given spanwise distance 178. Specifically, in the illustrated embodiment, a portion of the shell forming the pressure side 30 may be removed between the joint end 110 of the blade segment 102 and a front edge of the top scarfed section 175, thereby defining the offset edge 177. As will be described below, this removed portion of the shell may form part of the access window(s) 140, 141 defined between the blade segment 102 and the blade insert 106 when such components are positioned adjacent to one another.

Moreover, as shown in FIG. 6, a portion of the shell(s) forming the pressure and suction sides 30, 32 of the blade segment 102 may be recessed relative to the joint end 110 of the blade segment 102. For example, similar to the blade insert 106, only an inner layer of the shell(s) (e.g., one or more layers of laminate composite) may be configured to extend to the joint end 110 of the blade segment 102, thereby defining top and bottom flanges 179, 180 around portions of the perimeter of the joint end 110.

Referring now to FIGS. 7-9, several assembly views of the blade insert 106 shown in FIGS. 4 and 5 and the blade segment 102 shown in FIG. 6 are illustrated in accordance with aspects of the present subject matter. Specifically, FIG. 7 illustrates a perspective view of the blade insert 106 and the blade segment 102 positioned end-to-end, with suitable components for securing the blade insert 106 to the blade segment 102 being exploded outward. FIG. 8 illustrates a perspective, assembled view of the various components shown in FIG. 7 and FIG. 9 illustrates a cross-sectional view of the assembly shown in FIG. 8 taken about line 9-9.

As shown in FIG. 7, when the blade segment 102 and the blade insert 106 are positioned end-to-end, separate access windows (e.g., a first access window 140 and a second access window 141) may be defined between such components along either side of the elongated portion 147 of the top side 120 of the blade insert 106. Such access windows 140, 141 may generally allow a service worker(s) to access the interior of the rotor blade assembly 100, thereby facilitating the installation of many of the assembly components shown in FIG. 7. For example, in one embodiment, a bottom scarfed connector 181, bottom shell inserts 182 and a shear web insert 183 may be installed within the rotor blade assembly 100 via the access provided by the access windows 140, 141. Thereafter, the access windows 140, 141 may be covered by suitable window covers 184a, 184b to allow the assembly process to be finalized.

As indicated above, when the blade insert 106 and the blade segment 102 are positioned end-to-end, the bottom scarfed section 160 at the forward end 116 of the blade insert 106 may be configured to be aligned with the bottom scarfed section 176 of the blade segment 102. Specifically, as shown in FIG. 9, the aligned bottom scarfed sections 160, 176 may be configured to abut one another when the blade insert 106 and blade segment 102 are positioned together. In such an embodiment, a bottom scarfed connector 181 may be positioned across the bottom scarfed sections 160, 176 in order to facilitate coupling the blade insert 106 to the blade segment 102. Specifically, as shown in FIGS. 7 and 9, the bottom scarfed connector 181 may generally define a tapered profile corresponding to the tapered profiles defined by the bottom scarfed sections 160, 176. Thus, as shown in FIG. 9, the bottom scarfed connector 181 may be configured to extend across the interface defined between the blade segment 102 and the blade insert 106 so as to fill the open area defined by the bottom scarfed sections 160, 176.

In several embodiments, the bottom scarfed connector 181 may comprise a pre-fabricated component configured to be separately installed within the rotor blade assembly 100 (via one of the access windows 140, 141) and secured across the aligned bottom scarfed sections 160, 176, such as by securing the scarfed connector 181 within the bottom scarfed sections 160, 176 using suitable adhesives and/or mechanical fasteners (e.g., bolts, screws, pins, rivets, brackets and/or the like). Alternatively, the bottom scarfed connector 181 may be formed or otherwise built-up within the aligned bottom scarfed sections 160, 176. For instance, in one embodiment, the scarfed connector 181 may be formed using a wet lay-up process, wherein a plurality of plies (including a reinforcement material such as glass or carbon fibers) are positioned across and/or within the bottom scarfed sections 160, 176 and a resin or other suitable matrix material is rolled over or otherwise applied to the surface of the plies and allowed to cure.

In addition to the bottom scarfed sections 160, 176, the bottom flanges 174, 180 of the blade insert 106 and the blade segment 102 may also be configured to abut one another when the blade insert 106 is positioned end-to-end with the blade segment 102. As such, suitable bottom shell inserts 182 may be secured across the bottom flanges 174, 180 along either side of the bottom scarfed connector 181 to further secure the blade insert 106 and the blade segment 102 to one another Specifically, the bottom shell inserts 182 may generally configured to extend across the interface defined between the blade segment 102 and the blade insert 106 so as to fill the open area defined by bottom flanges 174, 180. For example, as shown in FIG. 7, the bottom shell inserts 182 may generally define a profile matching the profile of the corresponding portions of the shells for the blade insert 106 and the blade segment 102 and may also be formed from the same material (e.g., one or more layers of laminate component and/or one or more layers of core material 44). It should be appreciated that, similar to the bottom scarfed connector 181, the bottom shell inserts 182 may be pre-fabricated components or may be formed or otherwise built-up within the open area defined by the bottom flanges 174, 180.

As indicated above, a shear web insert 183 may also be installed within the rotor blade assembly 100 via one of the access windows 140, 141. As shown in FIG. 7, the shear web insert 183 may generally include a first side face 302 and a second side face 304 extending between first and second ends 306, 308. In general, the shear web insert 183 may be configured to extend spanwise between the terminating ends of the shear webs 48, 146 for the blade segment 102 and the blade insert 106. Specifically, as shown in FIG. 9, the shear web insert 183 may be configured to a define a length 185 between its first and second ends 306, 308 generally corresponding to the gap defined between the end of the shear web 48 for the blade segment 102 and the end of the shear web 146 for the blade insert 106. As such, the shear web insert 183 may be inserted within the rotor blade assembly 100 via one of the access windows 140, 141 and subsequently secured between the shear webs 48, 146. For instance, as will be described below, one or more positioning devices 310, 312, 314 and/or one or more retention devices (FIG. 9) may be coupled along the inner surfaces of the rotor blade assembly 100 (e.g., the inner surface 316 (FIG. 11) defined along the pressure side of the assembly 100 and the inner surface 318 (FIG. 11) defined along the suction side of the assembly 100) to assist in installing the shear web insert 183 between the shear webs 48, 146.

After installing such components within the rotor blade assembly 100, suitable window covers 184a, 184b may then installed between the blade insert 106 and the blade segment 106 so as to cover at least a portion of each access window 140, 141. For example, as shown in FIG. 7, a first window cover 184a may be configured to extend across and/or cover at least a portion of the first access window 140. Similarly, a second window cover 184b may be configured to extend across and/or cover at least a portion of the second access window 141. As shown in FIG. 7, the window covers 184a, 184b may generally have a similar construction to that of the shells used to form the blade insert 106 and the blade segment 102. For example, the window covers 184a, 184b may be formed from a layered construction, including one or more layers laminate material and one or more layers of core material 42.

Additionally, similar to the blade insert 106 and the blade segment 102, a portion of the shell(s) forming the window covers 184a, 184b may be recessed or offset, thereby defining cover flanges 188 around the edges of the window covers 184a, 184b. Thus, when each window cover 184a, 214b is installed across its corresponding access window 140, 141, the cover flanges 188 may be configured to abut against the top flanges 172, 179 of the blade insert 106 and the blade segment 102. Thereafter, a suitable top shell insert 189 may be secured across each interface defined between the blade segment 212 and the window covers 184a, 184b and across each interface defined between the blade insert 106 and the window covers 184a, 184b so as to fill the open area defined by the top and cover flanges 172, 179, 188. For example, as shown in FIG. 7, the top shell inserts 189 may generally define a profile matching the profile of the corresponding portions of the shells for the blade insert 106 and the blade segment 212 and may also be formed from the same material (e.g., one or more layers of laminate component and/or one or more layers of core material 42).

Moreover, as shown in the illustrated embodiment, the rotor blade assembly 100 may also include a top scarfed connector 190 configured to be positioned across the aligned top scarfed sections 152, 175 of the blade insert 106 and the blade segment 102. As shown in FIG. 7, the top scarfed connector 190 may define a tapered profile corresponding to the tapered profiles defined by the top scarfed sections 151, 175. Thus, as particularly shown in FIG. 9, the top scarfed connector 190 may be configured to extend across the interface defined between the blade segment 102 and the blade insert 106 so as to fill the area defined by the aligned top scarfed sections 152, 175.

It should be appreciated that, similar to the bottom scarfed connector 181 and the bottom shell inserts 182, the top scarfed connector 190 and the tip shell inserts 189 may be pre-fabricated components or may be formed or otherwise built-up during assembly of the rotor blade assembly 100.

It should also be appreciated that, after the various components of the rotor blade assembly 100 have been assembled between the blade segment 102 and the blade insert 106, an overlaminate may be applied around the outer surface of the assembly 100 to ensure a smooth aerodynamic transition between the blade segment 102 and the blade insert 106. For example, the overlaminate may be applied using a wet lay-up process, wherein one or more plies (including a reinforcement material such as glass or carbon fibers) are positioned along the outer surface and a resin or other suitable matrix material is rolled over or otherwise applied to the surface of the plies to form a smooth profile.

Moreover, it should be appreciated that, although the blade insert 106 was described with reference to FIGS. 7-9 as simply being secured to one of the blade segments (e.g., the first blade segment 102), the same or a similar methodology, as well as the same or similar components, may be used to secure the blade insert 106 to the other blade segment (e.g., the second blade segment 104). For example, a bottom scarfed connector 181, bottom shell inserts 182, a shear web insert 183, window cover(s) 184a, 184b, top shell inserts 189 and a top scarfed connector 190 may be installed between the aft end 118 of the blade insert 106 and the joint end 112 of the second blade segment 104 to allow such components to be secured to another in the same manner that the blade insert 106 and the first blade segment 102 were secured together (e.g., as shown in FIGS. 7-9).

Further, it should be appreciated that the blade insert 106 described herein may be considered as a blade segment. Thus, one of ordinary skill in the art should appreciate that the disclosed rotor blade assembly 100 may include one or a plurality of blade inserts 106, with each blade insert forming an individual segment of the rotor blade assembly 100.

Referring now to FIG. 10, a flow diagram of one embodiment of a method 200 for installing a shear web insert 183 between the blade insert 106 and one of the blade segments 102, 104 will be described in accordance with aspects of the present subject matter. In general, due to the configuration of the blade insert 106 (i.e., due to the elongated portions 147), the shear web insert 183 must be installed horizontally. Specifically, the shear web 183 must be inserted through one of the access windows 140, 141 and then inserted horizontally between the shear web 146 for the blade insert 106 and the shear web 48 for the corresponding blade segment 102, 104.

It should be appreciated that the method 200 will generally be described herein with reference to installing a shear web insert 183 between the blade insert 106 and the first blade segment 102. However, the same methodology may also be utilized for installing a shear web insert 183 between the blade insert 106 and the second blade segment 102. For purposes of describing the disclosed method 200, the shear web 48 of the first blade segment 102 will be referred to as a "first shear web 48" and the shear web 146 of the blade insert 106 will be described as a "second shear web 146." It should also be appreciated that, although method elements in FIG. 10 are shown in a particular order, the elements may generally be performed in any suitable order consistent with the disclosure provided herein.

As shown in FIG. 10, at (202), the method 200 includes coupling one or more positioning devices to an inner surface(s) of the rotor blade assembly. For instance, FIG. 11 illustrates a partially assembled, cross-sectional view of a portion of the disclosed rotor blade assembly 100 having positioning devices 310, 312 installed therein. As shown, a positioning device(s) 310, 312 may be configured to be coupled along each side of the rotor blade assembly 100. Specifically, a first positioning device 310 may be coupled to the inner surface 316 defined along the pressure side of the rotor blade assembly 100 (e.g., the inner surface 316 defined by the elongated portion 147 of the blade insert 106). Similarly, a second positioning device 312 may be coupled to the inner surface 318 defined along the suction side of the rotor blade assembly 100 (e.g., the inner surface defined by the bottom scarfed connector 191 extending across the interface between the blade insert 106 and the blade segment 102).

In general, the positioning devices 310, 312 may have any suitable configuration that allows such devices 310, 312 to serve as mechanical stops for positioning the shear web insert 183 between the first and second shear webs 48, 146. As shown, in several embodiments, the positioning devices 310, 312 may each define an "L" shaped structure having a horizontal portion 322 coupled to the inner surface 316, 318 of the assembly 100 (e.g., using a suitable adhesive(s) or mechanical fastener(s)) and a vertical portion 324 extending generally perpendicularly from the horizontal portion 322. In such an embodiment, the vertical portion 324 of each positioning device 310, 312 may generally be configured to serve as a mechanical stop for the shear web insert 183 as it is being inserted between the first and second shear webs 48, 146. In other embodiments, the positioning devices 310, 312 may have any other suitable configuration that allows such devices to function as described herein.

Additionally, as shown in FIG. 11, the first and second positioning devices 310, 312 may generally be configured to be aligned with one another in the horizontal or chordwise direction of the rotor blade assembly 100 (i.e., indicated by arrow 320). Specifically, in several embodiments, the vertical portions 324 of the positioning devices 310, 312 may be aligned at a first chordwise position (indicated by the line 326) that generally corresponds to the location at which the first side face 302 of the shear web insert 183 is to be positioned when the insert 183 is properly installed between the first and second shear webs 48, 146.

Moreover, in several embodiments, the positioning devices 310, 312 may be configured to extend in the spanwise direction (indicated by arrow 326 in FIG. 9) along all or a substantial portion of the length 185 of the shear web insert 183. For example, as shown in FIG. 9, the positioning devices 310, 312 define a length (not shown) generally corresponding to the length 185 of the shear web insert 183. Alternatively, the positioning devices 310, 312 may be configured to define a length that is shorter than the overall length 185 of the shear web insert 183. In such an embodiment, a plurality of positioning devices 310, 312 may, for example, be spaced apart along the length 185 of the shear web insert 183.

It should be appreciated that, in addition to acting as a mechanical stop, the positioning devices 310, 312 may also be used as a means for transferring loads through the rotor blade assembly 100. For example, by coupling one or more positioning devices 310, 312 along the length 185 of the shear web insert 183, shear loads may be transferred between the shear web insert 183 and the body 114 of the blade insert 106 and/or the body 28 of the blade segment 102.

It should also be appreciated that, in addition to coupling one or more positioning 310, 312 devices to the inner surfaces 316, 318 of the rotor blade assembly 100, one or more secondary positioning devices 314 may also be coupled to the shear web insert 183. For example, as shown in FIGS. 9 and 11, secondary positioning devices 314 may be coupled to the second side face 304 of the shear web insert 183 such that the devices 314 extend outwardly from each end 306, 108 of the insert 183. Thus, as the shear web insert 183 is inserted horizontally within the rotor blade assembly 100, the secondary positioning devices 314 may contact the first and second shear webs 48, 146 when the insert 183 is properly positioned between such shear webs 48, 146 (e.g., as shown in FIG. 16).

Referring back to FIG. 10, at (204), the method 200 includes applying an adhesive 328 along the inner surface(s) 316, 318 of the rotor blade assembly 100 at a location adjacent to the positioning device(s) 310, 312. For example, as shown in FIG. 11, a volume of adhesive 328 may be applied in a manner so that the adhesive 328 that extends from the vertical portions 324 of the positioning devices 310, 412 outward along the inner surfaces 316, 318. In applying the adhesive 328 along the inner surfaces 316, 318, it may be desirable to provide a sufficient amount of adhesive 328 so that a squeeze out occurs (e.g., as shown in FIG. 12) at the interface between the positioning devices 310, 312 and the shear web insert 183 and the interface between the inner surfaces 316, 318 and the shear web insert 183 when the insert 183 is positioned between the first and second shear webs 48, 146. As such, the adhesive 328 may be uniformly spread between the shear web insert 183 and the positioning devices 310, 312 and between the shear web insert 183 and the inner surfaces 316, 318 of the rotor blade assembly 100.

It should be appreciated that any suitable adhesive 328 known in the art may be utilized for securing the shear web insert 183 between the first and second shear webs 48, 146. In addition, it should be appreciated that the adhesive 328 may be applied along the inner surfaces 316, 318 of the rotor blade assembly 100 so as to form any suitable cross-sectional shape. For instance, as shown in FIG. 11, the adhesive 328 forms a triangular cross-sectional shape, which may be advantageous for ensuring proper squeeze out of the adhesive 328. However, in other embodiments, the adhesive 328 may be applied to the inner surfaces 316, 318 so as to form any other cross-sectional shape.

Referring back to FIG. 10, at (206), the method 200 includes inserting the shear web insert 183 horizontally between the first and second shear webs 48, 146. Specifically, in several embodiments, the shear web insert 183 may be inserted between the first and second shear webs 48, 146 until the first side face 302 of the insert 183 engages the positioning devices 310, 312 (and/or until the secondary positioning devices 314 engage the first and second shear webs 48, 146), thereby indicating that the shear web insert 183 is properly positioned within the rotor blade assembly 100. As used herein, the shear web insert 183 may be engaged with the positioning devices 310, 312 by contacting the devices 310, 312 directly or by contacting the devices 310, 312 indirectly (e.g., via the adhesive 328). For instance, as shown in FIG. 12, the shear web insert 183 may be considered to be engaged with the positioning devices 310 312 even through a layer of adhesive 328 is present between the first side face 302 of the shear web insert 183 and the vertical portion 324 of each positioning device 310, 312.

As shown in FIG. 12, when the shear web insert 183 is pushed horizontally into engagement with the positioning devices 310, 312, the adhesive 328 may be squeezed out from between the shear web insert 183, the inner surfaces 316, 318 and the positioning devices 310, 312, thereby providing an indication that the adhesive 328 has spread out between such components. In several embodiments, a top face 330 and/or a bottom face 332 of the shear web insert 182 may be shaped or otherwise configured to assist in allowing a proper squeeze out of the adhesive 183. For example, as shown in FIG. 12, the top and bottom faces 330, 332 may be angled relative to the inner surfaces 316, 318 of the rotor blade assembly 100. Specifically, as shown in the close up view of FIG. 13, the top face 330 may be angled towards the positioning device 310 so that a first gap 334 defined between the top face 330 and the inner surface 316 at the first side face 302 of the shear web insert 183 is larger than a second gap 336 defined between the top face 330 and the inner surface 316 at the second side face 304 of the shear web insert 183. Similarly, as shown in FIG. 12, the bottom face 332 may be angled towards the positioning device 312 so that a first gap 335 defined between the bottom face 332 and the inner surface 318 at the first side face 302 of the shear web insert 183 is larger than a second gap 337 defined between the bottom face 332 and the inner surface 318 at the second side face 304 of the shear web insert 183. For instance, in several embodiments, the top and bottom faces 330, 332 may be configured to define an angle 338 relative to the inner surfaces 316, 318 that ranges from about 5 degrees to about 50 degrees, such as from about 10 degrees to about 45 degrees or from about 10 degrees to about 25 degrees and any other subranges therebetween. By configuring the top and bottom faces 330, 332 as shown in FIGS. 12 and 13, the adhesive 328 may advantageously spread between the shear web insert 183 and the inner surfaces/positioning devices 316, 318, 310, 312 when the shear web insert 182 is properly positioned between the first and second shear webs 48, 146.

It should be appreciated that the gaps 334, 336 defined between the shear web insert 183 and the inner surfaces 316, 318 may generally correspond to any suitable distance. However, in several embodiments, the first gap 334 may generally range from about 5 millimeters (mm) to about 50 mm, such as from about 10 mm to about 40 mm or from about 10 mm to about 30 mm and any other subranges therebetween. Similarly, in several embodiments, the second gap 336 may generally range from 0 mm to about 30 mm, such as from 0 mm to about 25 mm or from about 5 mm to about 20 mm and any other subranges therebetween.

It should also be appreciated that, after positioning the shear web insert 183 between the first and second shear webs 48, 146, the insert 183 may be clamped or otherwise secured within the rotor blade assembly 100 to allow the adhesive 328 to cure. For example, as shown in FIG. 12, a clamp 340 (shown in dashed lines) may be used to clamp the shear web insert 183 to the positioning devices 310, 312 in order to hold the insert 183 in position while the adhesive 328 cures.

Referring back to FIG. 10, at (208), the method 200 includes coupling one or more retention devices 342, 344 to the inner surface(s) 316, 318 of the rotor blade assembly 100 so that the retention devices 342, 344 are positioned adjacent to and/or otherwise engage the second side face 304 of the shear web insert 183. For instance, as shown in FIG. 14, a first retention device 342 may be coupled to the inner surface 316 defined along the pressure side of the rotor blade assembly 100. Similarly, a second retention device 344 may be coupled to the inner surface 318 defined along the suction side of the rotor blade assembly 100, with the second retention device 344 being generally aligned with the first retention device 342 in the chordwise direction 320. The retention devices 342, 344 may generally be configured to serve as means for retaining the shear web insert 183 within the rotor blade assembly 100. In addition, the retention devices 342, 344 may also be configured to serve as a means for transferring loads between the shear web insert 183 and the body 28, 114 of the rotor blade assembly 102 and/or the blade insert 106.

It should be appreciated that the retention devices 342, 344 may generally have any suitable configuration that allows such device(s) 342, 344 to function as described herein. For instance, as shown in FIG. 14, the retention devices 342, 344 may be configured similarly to the positioning devices 310, 312 described above and, thus, may include a horizontal portion 346 configured to be coupled to the inner surfaces 316, 318 (e.g., using a suitable adhesive(s) or mechanical fastener(s)) and a vertical portion 348 extending generally perpendicularly from the horizontal portion 346 so as to define a generally "L" shaped structure. However, in other embodiments, the retention devices 342, 344 may have any other suitable configuration.

It should also be appreciated that, in several embodiments, perpendicularly oriented interfaces may be defined between the ends 306, 308 of the shear web insert 183 and the corresponding ends of the first and second shear webs 48, 146. For instance, as shown in FIG. 8, the ends of the insert 183 and the shear webs 48, 146 extend perpendicularly from the inner surfaces 316, 318 of the rotor assembly 100 in a flap wise direction (indicated by arrow 350), thereby defining perpendicular interfaces between the insert 183 and the shear webs 48, 146 in such direction 350. In alternative embodiments, angled interfaces may be defined between the shear web insert 183 and the first and second shear webs 48, 146. For instance, as shown in FIG. 15, the ends of the insert 183 and the shear webs 48, 146 may be angled relative to the flapwise direction 350 such that an angled interface is defined between the insert 183 and each shear web 48, 146. In such an embodiment, each angled interface may generally define any suitable angle 352, such as an angle 352 ranging from 0 degrees to about 50 degrees or from about 5 degrees to about 50 degrees or from about 10 degrees to about 45 degrees and any other subranges therebetween.

In addition to defining angled interfaces relative to the flapwise direction 350, an angled interface may also be defined between the shear web insert 183 and each shear web 48, 146 in the horizontal or chordwise direction 320. For instance, FIG. 16 illustrates a cross-sectional view of the rotor blade assembly 100 shown in FIG. 9 taken about line 16-16. As shown, the ends of the insert 183 and the shear webs 48, 146 are angled relative to the chordwise direction 320 such that an angled interface is defined between the insert 183 and each shear web 48, 146. Thus, the angled interfaces may serve as a positioning or wedging feature when the shear web insert 183 is installed horizontally between the first and second shear webs 48, 146. In such an embodiment, it should be appreciated that each angled interface may generally define any suitable angle 354, such as an angle 354 ranging from 0 degrees to about 50 degrees or from about 5 degrees to about 50 degrees or from about 10 degrees to about 45 degrees and any other subranges therebetween.

It should be appreciated by those of ordinary skill in the art that the specific views shown in FIGS. 11-14 simply illustrate one implementation of the method 200 described herein. For instance, in another embodiment, method element (202) may be performed by coupling the positioning devices 310, 312 to the inner surfaces 316, 318 so that the devices 310, 312 engage opposite faces 302, 304 of the shear web insert 183 (as opposed to coupling the positioning devices 310, 312 along a common face of the shear web insert 183 as shown in FIG. 11). An example of such an embodiment is illustrated in FIGS. 17 and 18. As shown in FIG. 17, the first positioning device 310 may be coupled to the inner surface 316 at a location for engaging the second side face 304 of the shear web insert 183 and the second positioning device 312 may be coupled to the inner surface 318 at a location for engaging the first side face 302 of the shear web insert 183. In such an embodiment, a suitable adhesive 328 may be applied to the inner surfaces 316, 318 adjacent to each positioning device 310, 312. Thereafter, when the shear web insert 182 is inserted through the access window 104, 141 and positioned horizontally between the shear webs 48, 146, the shear web insert 183 may be rotated (as indicated by the dashed lines) until the second side face 304 engages the first positioning device 310 and the first side face 302 engages the second positioning device 312. After the adhesive is allowed to cure, the retention devices 342, 344 may then be coupled to the inner surfaces 316, 318. For instance, as shown in FIG. 18, the first retention device 342 may be coupled to the inner surface 316 adjacent to the first side face 302 and the second retention device 344 may be coupled to the inner surface 318 adjacent to the second side face 304.

It should also be appreciated that, although the shear web insert 183 is described herein as a single component, the insert 183 may be formed from multiple shear web segments coupled to one another within the rotor blade assembly 100. Specifically, embodiments including a multi-piece shear web insert 183 may be advantageous when sufficient access to the interior of the rotor blade assembly 100 is not available via the access windows 140, 141.

For instance, FIGS. 19 and 20 illustrate example installation views of one embodiment of a shear web insert 183 formed from two shear web segments (i.e., an upper shear web segment 183a and a lower shear web segment 183b). As shown in FIG. 19, one of the shear web segments (e.g., the lower shear web segment 183b) may be initially installed within the rotor blade assembly 100, such as by inserting the lower shear web segment 183b horizontally within the assembly 100 until it engages a corresponding positioning device 312. Additionally, a suitable adhesive 328 may be applied along the surface of the installed shear web segment (e.g., angled surface 360) at the location at which the interface between the two shear web segments 183a, 183b will be defined. The other shear web segment (e.g., the upper shear web segment 183a) may then be installed within the rotor blade assembly 100, such as by inserting the upper shear web segment 183a horizontally within the assembly 100 until it engages a corresponding positioning device 310 and/or the lower shear web insert 183b. As shown in FIG. 20, suitable retaining devices 342, 344 may also be installed along the shear web segments 183a, 183b opposite the positioning devices 310, 312. Additionally, in one embodiment, an overlaminate 362 (FIG. 20) may be applied along each side of the interface defined between the shear web segments 183a, 183b to further secure the connection joint.

Similarly, FIGS. 21 and 22 illustrate example installation views of one embodiment of a shear web insert formed from three shear web segments (i.e., an upper shear web segment 183a, a lower shear web segment 183b and a middle shear web segment 183c). As particularly shown in FIG. 21, the upper and lower shear web segments 183a, 183b may be initially installed within the rotor blade assembly 100, such as by inserting the upper and lower segments 183a, 183b horizontally within the assembly 100 until each segment 183a, 183b engages its corresponding positioning device 310, 312. Suitable retaining devices 342, 344 may also be installed along the upper and lower shear web segments 183a, 183b opposite the positioning devices 310, 312. Additionally, as shown in FIG. 21, an adhesive 328 may be applied along the surfaces of the installed shear web segments 183a, 183b (e.g., angled surfaces 360) at the locations at which the interfaces between the middle shear web segment 183c and the upper and lower shear web segments 183a, 183b will be defined. The middle shear web segment 183c may then be installed horizontally between the upper and lower shear web segments 183a, 183b. As shown in FIG. 21, in several embodiments, one or more secondary positioning devices 314 may be coupled to the middle shear web segment 183c to ensure that the segment 183c is properly installed between the upper and lower segments 183a, 183b (e.g., by moving the middle shear web segment 183c horizontally until the positioning devices 314 contact the upper and lower shear web segments 183a, 183b. Thereafter, the secondary positioning devices 314 may be removed and an overlaminate 362 may be applied along each side of the interfaces defined between the shear web segments 183a, 183b, 183c to further secure the connection joints.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing a shear web insert between a blade segment and a blade insert of a rotor blade assembly, the blade segment including a first shear web and the blade insert including a second shear web, the method comprising:

coupling a first positioning device along an inner surface of a first side of the rotor blade assembly, the first side of the rotor blade assembly corresponding to one of a pressure side or a suction side of the rotor blade assembly, an opposite second side of the rotor blade assembly corresponding to the other of the pressure side or the suction side of the rotor blade assembly;

inserting the shear web insert horizontally between the first and second shear webs until a first side face of the shear web insert engages the first positioning device, the shear web insert including a second side face opposite the first side face, the shear web insert extending vertically between the first and second sides of the rotor blade assembly; and after the shear web insert has been inserted between the first and second shear webs so as to engage the first side face of the shear web insert with the first positioning device, coupling a first retention device along the inner surface of the first side of the rotor blade assembly so that the first retention device is positioned adjacent to a second side face of the shear web insert, the shear web insert being positioned horizontally between the first positioning device and the first retention device.

2. The method of claim 1, further comprising coupling a second positioning device along an inner surface of the second side of the rotor blade assembly, the second positioning device being aligned with the first positioning device along a chordwise direction of the rotor blade assembly.

3. The method of claim 2, wherein the shear web insert is inserted horizontally between the first and second shear webs until the first side face of the shear web inset engages the first and second positioning devices.

4. The method of claim 2, further comprising coupling a second retention device along the inner surface of the second side of the rotor blade
assembly so that the second retention device is positioned adjacent to the second side face of the shear web insert, the second retention device being aligned with the first retention device along the chordwise direction.

5. The method of claim 1, further comprising inserting the shear web insert horizontally between the first and second shear webs such that a first gap is defined between the inner surface of the first side of the rotor blade assembly and a top face of the shear web insert that is aligned with the first side face of the shear web insert and a second gap is defined between the inner surface and the top face that is aligned with the second side face of the shear web insert.

6. The method of claim 5, wherein the top face is angled such that the first gap is larger than the second gap.

7. The method of claim 5, wherein the top face is oriented at an angle ranging from about 5 degrees to about 50 degrees.

8. The method of claim 5, wherein the first gap ranges from about 5 millimeters to about 50 millimeters and the second gap ranges from 0 millimeters to about 30 millimeters.

9. The method of claim 1, wherein the shear web insert is formed from two or more shear web segments.

10. The method of claim 1, further comprising applying adhesive along the inner surface at a location adjacent to the first positioning device prior to inserting the shear web insert between the first and second shear webs.

11. The method of claim 1, wherein an access window is defined between the blade segment and the blade insert, further comprising inserting the shear web insert through the access window prior to inserting the shear web insert horizontally between the first and second shear webs.

12. The method of claim 1, wherein an angled interface is defined between the shear web insert and at least one of the first shear web or the second shear web, the angled interface being angled relative to a chordwise direction of the rotor blade assembly.

13. The method of claim 1, wherein an angled interface is defined between the shear web insert and at least one of the first shear web or the second shear web, the angled interface being angled relative to a flapwise direction of the rotor blade assembly.

14. The method of claim 1, further comprising coupling a secondary positioning device to the second side face such that the secondary positioning device is configured to contact one of the first shear web or the second shear web when the shear web insert is inserted between the first and second shear webs.

15. The method of claim 1, further comprising coupling a second positioning device along an inner surface of the second side of the rotor blade assembly, wherein inserting the shear web insert horizontally between the first and second shear webs comprises rotating the shear web insert between the first and second shear webs until the shear web insert engages the first and second positioning devices.

16. A rotor blade assembly for a wind turbine having a first side and a second side, the first side of the rotor blade assembly corresponding to one of a pressure side or a suction side of the rotor blade assembly, an opposite second side of the rotor blade assembly corresponding to the other of the pressure side or the suction side of the rotor blade assembly, the rotor blade assembly comprising:

a blade segment defining a joint end, the blade segment including a first shear web;

a blade insert coupled to the joint end of the blade segment, the blade insert including a second shear web;

a shear web insert extending between the first and second shear webs the shear web insert extending vertically between the first and second sides of the rotor blade assembly, the shear web insert defining a first side face and a second side face disposed opposite the first side face;

a first positioning device coupled to an inner surface of at least one of the blade segment or the blade insert along the first side of the rotor blade assembly, the first positioning device being configured to engage the first side face of the shear web insert; and a first retaining device coupled to the inner surface of the at least one of the blade segment or the blade insert along the first side of the rotor blade assembly, the first retaining device being positioned adjacent to the second side face of the shear web insert such that the shear web insert is positioned horizontally between the first positioning device and the first retention device.

17. The rotor blade assembly of claim 16, further comprising a second positioning device coupled to an inner surface of at least one of the blade segment or the blade insert along the second side of the rotor blade assembly, the second positioning device being aligned with the first positioning device along a chordwise direction of the rotor blade assembly.

18. The rotor blade assembly of claim 17, further comprising a second retention device coupled to the inner surface of at least one of the blade segment or the bade insert along the second side of the rotor blade assembly so that the second retention device is positioned adjacent to the second side face of the shear web insert, the second retention device being aligned with the first retention device along the chordwise direction.

19. The rotor blade assembly of claim 16, wherein a first gap is defined between the inner surface of at least one of the blade segment or the blade insert and a top face of the shear web insert along that is aligned with the first side face of the shear web insert and a second gap is defined between the inner surface of at least one of the blade segment or the blade insert and the top face along that is aligned with the second side face of the shear web insert, the top face being angled such that the first gap is larger than the second gap.

20. The rotor blade assembly of claim 19, wherein the top face is oriented at an angle ranging from about 5 degrees to about 50 degrees.

* * * * *